United States Patent
Texier et al.

(10) Patent No.: US 12,289,376 B2
(45) Date of Patent: Apr. 29, 2025

(54) DEVICE, SYSTEM AND METHOD FOR PROVIDING A DATA PATHWAY BETWEEN A CLIENT DEVICE AND A PROVIDER SYSTEM

(71) Applicant: AMADEUS S.A.S., Biot (FR)

(72) Inventors: Rodolphe Texier, Vallauris (FR);
Herve Prezet, Mougins (FR);
Massimiliano Maini, Biot (FR);
Pierre-Jean Reissman, Biot (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 18/373,444

(22) Filed: Sep. 27, 2023

(65) Prior Publication Data

US 2025/0106295 A1     Mar. 27, 2025

(51) Int. Cl.
*H04L 67/2871* (2022.01)
*H04L 45/00* (2022.01)
*H04L 67/75* (2022.01)

(52) U.S. Cl.
CPC .......... *H04L 67/2871* (2013.01); *H04L 45/22* (2013.01); *H04L 67/75* (2022.05)

(58) Field of Classification Search
CPC ...... H04L 67/2871; H04L 67/75; H04L 45/22
(Continued)

(56) References Cited

U.S. PATENT DOCUMENTS 5,835,914 A * 11/1998 Brim ................ G06F 9/465
                                                    709/203
6,243,761 B1 * 6/2001 Mogul ................ H04L 67/01
                                                    709/219

(Continued)

FOREIGN PATENT DOCUMENTS

EP     3825946 A1    5/2021
EP     4202809 A1    6/2023
(Continued)

OTHER PUBLICATIONS https://web.archive.org/web/20230516004851/https://www.amazon.ca/stores/page/A3B67351-62AA-40CE-B6AB-7650FACA840D/ (May 16, 2023).

(Continued)

*Primary Examiner* — Wing F Chan
*Assistant Examiner* — John Fan
(74) *Attorney, Agent, or Firm* — PERRY + CURRIER INC.

(57) ABSTRACT

A device, system and method for providing a data pathway between a client device and a provider system are provided. An intermediation server receives, from a provider system, a computing module associated with a given command of a computing-process flow implemented in conjunction with communicating with a client device. The server provides, to the client device, a link to the computing module in conjunction with implementing the given command of the computing-process flow and, responsive to receiving an indication that the link to the computing module is selected, executes the computing module, including providing given data of the computing-process flow to the computing module, the computing module providing a data pathway between the client device and the provider system to modify the given data. The server receives, from the computing module, modified given data, and continues to implement the computing-process flow using the modified given data.

18 Claims, 15 Drawing Sheets

(58) Field of Classification Search
USPC .......................................................... 709/203
See application file for complete search history.

(56) References Cited

U.S. PATENT DOCUMENTS

| | | | |
|---|---|---|---|
| 6,470,383 B1* | 10/2002 | Leshem | G06Q 30/02 |
| | | | 714/E11.181 |
| 11,595,494 B1 | 2/2023 | Texier et al. | |
| 2003/0005447 A1 | 1/2003 | Rodriguez | |
| 2009/0125715 A1* | 5/2009 | Schuba | H04L 63/0823 |
| | | | 726/2 |
| 2010/0268557 A1 | 10/2010 | Faith et al. | |
| 2011/0145087 A1 | 6/2011 | Daman et al. | |
| 2012/0084105 A1 | 4/2012 | Boeing | |
| 2014/0058863 A1 | 2/2014 | Biswas et al. | |
| 2016/0203422 A1 | 7/2016 | Demarchi et al. | |
| 2016/0378874 A1 | 12/2016 | Jafri | |
| 2017/0330110 A1 | 11/2017 | Aurangabadkar | |
| 2018/0182017 A1 | 6/2018 | O'Neil-Dunne et al. | |
| 2020/0379971 A1 | 12/2020 | Hays et al. | |
| 2020/0380425 A1 | 12/2020 | Brun et al. | |
| 2021/0049714 A1 | 2/2021 | Shaaban et al. | |
| 2021/0118030 A1 | 4/2021 | Amadieu et al. | |
| 2021/0166294 A1* | 6/2021 | Landra | G06F 16/2358 |
| 2021/0174266 A1* | 6/2021 | Akrimi | G06F 16/24539 |
| 2023/0206138 A1 | 6/2023 | Textier et al. | |

FOREIGN PATENT DOCUMENTS

| | | | | |
|---|---|---|---|---|
| FR | 2908578 A1 * | 5/2008 | | G06Q 20/02 |
| JP | 5549507 B2 * | 7/2014 | | |
| WO | WO-2017004251 A1 | 1/2017 | | |

OTHER PUBLICATIONS https://web.archive.org/web/20221126231017/https://walkthechat.com/wechat-shops/ (Nov. 26, 2022).

U.S. Appl. No. 17/561,189, Device, System and Method Controlling Operation of a Client Device via an Intermediation Server, filed Dec. 23, 2021.

* cited by examiner

DEVICE, SYSTEM AND METHOD FOR PROVIDING A DATA PATHWAY BETWEEN A CLIENT DEVICE AND A PROVIDER SYSTEM

FIELD

The specification relates generally to intermediation between devices, and specifically to a device, system and method for providing a data pathway between a client device and a provider system.

BACKGROUND

The provision of various products, including for example travel-related goods and services (e.g., flights, hotel reservations, and the like) typically requires various discrete entities to exchange data defining various aspects of the products. Examples of such entities, in the context of travel-related products, include airlines, travel agencies, end users, reservation systems, and the like. Such entities may be configured to exchange data according to standardized formats and/or computing-process flows (e.g., in the context of travel-related products, according to the Global Distribution System (GDS)-based data exchange standard, and/or according to the extensible Markup Language (XML)-based New Distribution Capability (NDC). Such standardized formats and/or computing-process flows may, however, be restrictive, and adapting such standardized formats and/or computing-process flows for other types of data exchanges may require substantial processing resources.

SUMMARY

A first aspect of the present specification provides a method comprising: receiving, via an intermediation server, from a provider system, a computing module associated with a given command of a computing-process flow implemented in conjunction with communicating with a client device, the computing module compatible with data of the computing-process flow; providing, via the intermediation server, to the client device, a link to the computing module in conjunction with implementing the given command of the computing-process flow; in response to receiving an indication that the link to the computing module is selected, executing, via the intermediation server, the computing module, including providing given data of the computing-process flow to the computing module, the computing module providing a data pathway between the client device and the provider system to modify the given data; receiving, via the intermediation server, from the computing module, modified given data compatible with the computing-process flow; and continuing, via the intermediation server, to implement the computing-process flow using the modified given data.

The method of the first aspect may further comprise: maintaining an association table between a plurality of given commands of the computing-process flow and a plurality of computing modules provided by the provider system, including the given command associated with the computing module; and providing, via the intermediation server, a respective link to a respective computing module in conjunction with implementing a respective given command of the computing-process flow.

The method of the first aspect may further comprise: in conjunction with implementing the computing-process flow, embedding, in a graphic user interface (GUI), the link to the computing module in conjunction with implementing the given command; and providing the GUI with the link, as embedded, to the client device, and receiving the indication that the link to the computing module is selected may comprise receiving a selection of the link embedded in the GUI from the client device.

At the method of the first aspect, executing the computing module may comprise one or more of: receiving, at the computing module, input from one or more of the client device and the provider system that is processed by the computing module in conjunction with modifying the given data; and providing, from the computing module, to the provider system, the given data which returns the modified given data.

The method of the first aspect may further comprise: in conjunction with executing the computing module, providing, to the client device, a respective graphic user interface (GUI) for receiving input to modify the given data used by the computing-process flow, the respective GUI further for providing the input to modify the given data via the data pathway between the client device and the provider system. At the method of the first aspect, the respective GUI may be provided to the client device as an overlay to a GUI associated with the computing-process flow.

The method of the first aspect may further comprise: implementing, via the intermediation server, a computing module engine to execute the computing module, the computing module engine isolated from other components of the intermediation server implementing the computing-process flow.

At the method of the first aspect, the computing module may comprise one or more predefined input fields and one or more predefined output fields, and the given data of the computing-process flow the computing module may be provided via the one or more predefined input fields, and the modified given data may be received via the one or more predefined output fields.

At the method of the first aspect, one or more of the intermediation server and the provider system may operate according to a Global Distribution System (GDS)-based data exchange.

A second aspect of the present specification provides an intermediation server for interaction with a virtual platform, the intermediation server comprising: a controller; and a computer-readable storage medium having stored thereon program instructions that, when executed by the controller, causes the controller to perform a set of operations comprising: receiving, from a provider system, a computing module associated with a given command of a computing-process flow implemented in conjunction with communicating with a client device, the computing module compatible with data of the computing-process flow; providing, to the client device, a link to the computing module in conjunction with implementing the given command of the computing-process flow; in response to receiving an indication that the link to the computing module is selected, executing the computing module, including providing given data of the computing-process flow to the computing module, the computing module providing a data pathway between the client device and the provider system to modify the given data; receiving, from the computing module, modified given data compatible with the computing-process flow; and continuing to implement the computing-process flow using the modified given data.

At the intermediation server of the second aspect, the set of operations further may comprise: maintaining an association table between a plurality of given commands of the computing-process flow and a plurality of computing modules provided by the provider system, including the given command associated with the computing module; and providing a respective link to a respective computing module in conjunction with implementing a respective given command of the computing-process flow.

At the intermediation server of the second aspect, the set of operations further may comprise: in conjunction with implementing the computing-process flow, embedding, in a graphic user interface (GUI), the link to the computing module in conjunction with implementing the given command; and providing the GUI with the link, as embedded, to the client device, and receiving the indication that the link to the computing module is selected may comprise receiving a selection of the link embedded in the GUI from the client device.

At the intermediation server of the second aspect, executing the computing module may comprise one or more of: receiving, at the computing module, input from one or more of the client device and the provider system that is processed by the computing module in conjunction with modifying the given data; and providing, from the computing module, to the provider system, the given data which returns the modified given data.

At the intermediation server of the second aspect, the set of operations further may comprise: in conjunction with executing the computing module, providing, to the client device, a respective graphic user interface (GUI) for receiving input to modify the given data used by the computing-process flow, the respective GUI further for providing the input to modify the given data via the data pathway between the client device and the provider system. At the intermediation server of the second aspect, the respective GUI may be provided to the client device as an overlay to a GUI associated with the computing-process flow.

At the intermediation server of the second aspect, the set of operations further may comprise: implementing a computing module engine to execute the computing module, the computing module engine isolated from other components of the intermediation server implementing the computing-process flow.

At the intermediation server of the second aspect, the computing module may comprise one or more predefined input fields and one or more predefined output fields, and the given data of the computing-process flow the computing module may be provided via the one or more predefined input fields, and the modified given data may be received via the one or more predefined output fields.

At the intermediation server of the second aspect, one or more of the intermediation server and the provider system may operate according to a Global Distribution System (GDS)-based data exchange.

A third aspect of the present specification provides a non-transitory computer-readable storage medium having stored thereon program instructions that, when executed by a computing device, causes the computing device to perform a method comprising: receiving, via an intermediation server, from a provider system, a computing module associated with a given command of a computing-process flow implemented in conjunction with communicating with a client device, the computing module compatible with data of the computing-process flow; providing, via the intermediation server, to the client device, a link to the computing module in conjunction with implementing the given command of the computing-process flow; in response to receiving an indication that the link to the computing module is selected, executing, via the intermediation server, the computing module, including providing given data of the computing-process flow to the computing module, the computing module providing a data pathway between the client device and the provider system to modify the given data; receiving, via the intermediation server, from the computing module, modified given data compatible with the computing-process flow; and continuing, via the intermediation server, to implement the computing-process flow using the modified given data.

The method of the third aspect may further comprise: maintaining an association table between a plurality of given commands of the computing-process flow and a plurality of computing modules provided by the provider system, including the given command associated with the computing module; and providing, via the intermediation server, a respective link to a respective computing module in conjunction with implementing a respective given command of the computing-process flow.

The method of the third aspect may further comprise: in conjunction with implementing the computing-process flow, embedding, in a graphic user interface (GUI), the link to the computing module in conjunction with implementing the given command; and providing the GUI with the link, as embedded, to the client device, and receiving the indication that the link to the computing module is selected may comprise receiving a selection of the link embedded in the GUI from the client device.

At the method of the third aspect, executing the computing module may comprise one or more of: receiving, at the computing module, input from one or more of the client device and the provider system that is processed by the computing module in conjunction with modifying the given data; and providing, from the computing module, to the provider system, the given data which returns the modified given data.

The method of the third aspect may further comprise: in conjunction with executing the computing module, providing, to the client device, a respective graphic user interface (GUI) for receiving input to modify the given data used by the computing-process flow, the respective GUI further for providing the input to modify the given data via the data pathway between the client device and the provider system. At the method of the third aspect, the respective GUI may be provided to the client device as an overlay to a GUI associated with the computing-process flow.

The method of the third aspect may further comprise: implementing, via the intermediation server, a computing module engine to execute the computing module, the computing module engine isolated from other components of the intermediation server implementing the computing-process flow.

At the method of the third aspect, the computing module may comprise one or more predefined input fields and one or more predefined output fields, and the given data of the computing-process flow the computing module may be provided via the one or more predefined input fields, and the modified given data may be received via the one or more predefined output fields.

At the method of the third aspect, one or more of the intermediation server and the provider system may operate according to a Global Distribution System (GDS)-based data exchange.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Figure 1:
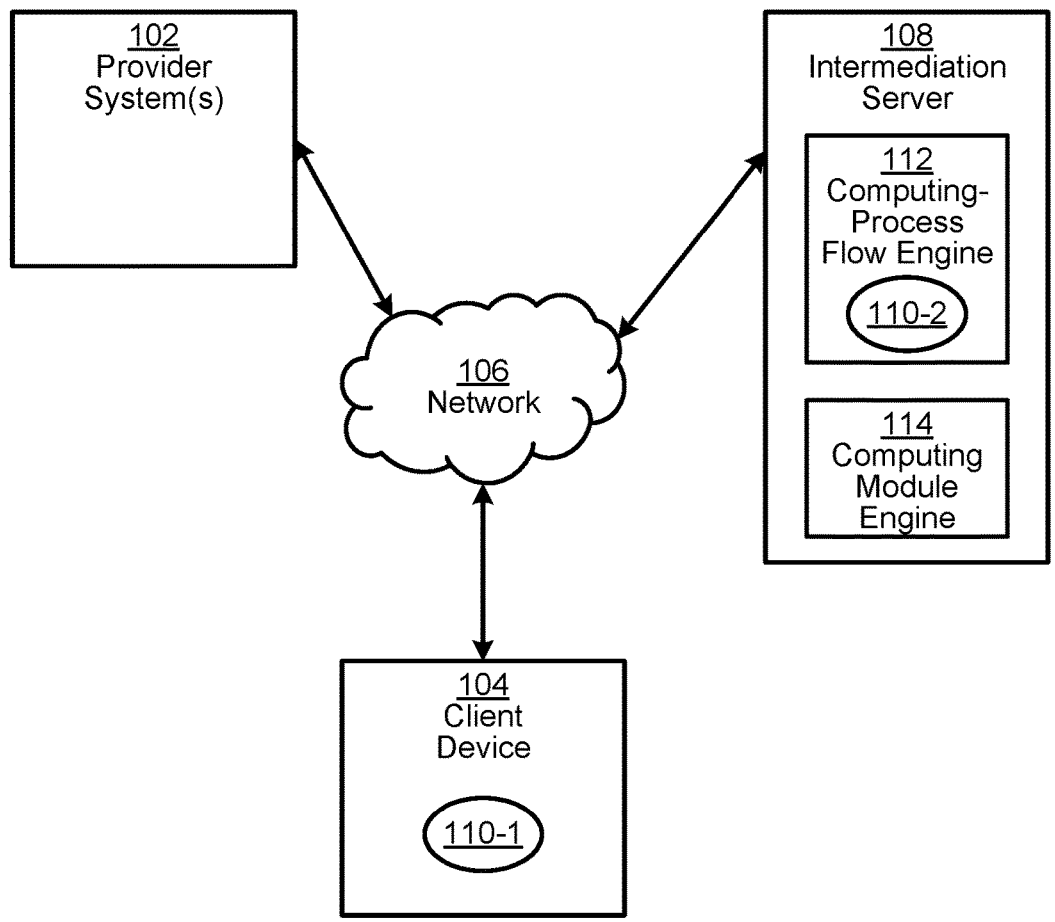
FIG. 1 depicts a system for providing a data pathway between a client device and a provider system, according to non-limiting examples.

FIG. 1 depicts a system 100 for intermediation between a provider system and a client device. The system 100 includes one or more provider systems 102 (e.g., one or more servers or other suitable computing devices), which in may be operated by one or more provider entities. The system 100 may include a plurality of client devices 104, although only one client device 104 is shown in FIG. 1 for illustrative purposes.

Provider objects, in the examples discussed herein, may comprise provider objects and/or data records which correspond to products and/or items, such as travel-related goods and services (e.g., flights, hotel reservations, car rentals and the like), provided by a provider system 102. More specifically, the products and/or items discussed in the examples below may be flight tickets and related services (e.g., limo pickup services, excursions at a destination, baggage check services, in-flight food, entertainment, pet-related services, and the like). However, as will be apparent to those skilled in the art, the systems and methods discussed below may also be applied to various other types of data objects and/or items including, but not limited to, data objects correspond to any suitable products and/or any suitable items available from any suitable website, and the like. Delivery of the items mentioned above is typically controlled by a provider entity operating a provider system 102, such as an airline in the case of the items discussed in connection with the examples provided herein.

The system 100 may include a plurality of provider systems 102, each operated by respective provider entities (e.g., various airlines), although only one provider system 102 is shown for illustrative purposes. The provider objects may be in any suitable format including, but not limited to Edifact recommendations in the context of Global Distribution System (GDS)-based data exchange, offer records in the context of New Distribution Capability (NDC)-based data exchange, and/or any other suitable format. Indeed, the provider objects may comprise data objects and/or data records, for example storing an Edifact recommendation or an NDC offer, and/or any other suitable data representing at least one item provided by the provider system 102.

A provider object is understood to define an item, or a combination of items, which may be offered for purchase (e.g., by end users of the items) including, but not limited to one or more of flights, train rides, hotel stays, airport lounge access, seat upgrades, baggage check services, in-flight food, entertainment, pickup services, excursion services, pet-related services, and the like, and/or associated services. Thus, in examples discussed below, a provider object may define a flight operated by the provider entity, and/or services associated with the flight, or proposed as standalone services. Each provider object therefore may contain various fields (e.g., data fields), and the like. Certain fields define item attributes, such as product object identifiers (e.g., service identifiers, item identifiers, product identifiers and the like), locations, dates and times corresponding to the products (e.g., flight times and other itinerary data). The type of fields and/or data of a provider object may depend on a type of a provider object. For example, provider objects corresponding to flights may include flight identifiers, whereas provider objects corresponding to other travel-related items, such as an offer for accessing an airport lounge and/or an offer for a premium seat upgrade, may include information related to the lounge, the premium seat, etc.

Requests for provider objects may be received at the provider system 102 from other components of the system 100. For example, the requests may be received from a client device 104, via a network 106 (e.g., any suitable combination of local and wide area networks, including the Internet) and via an intermediation server 108. As will be described below, the intermediation server 108 generally intermediates between the client device 104 and the provider system 102, such that the client device 104 may request provider objects from the provider system 102, and/or more than one provider system 102, via the intermediation server 108.

Furthermore, the intermediation server 108 may convert data between formats associated with provider systems 102 and the client device 104. For example, a first provider system 102 may communicate and/or provide provider objects, and/or offers for provider objects, according to a first standard type, and a second provider system 102 may communicate and/or provide provider objects, and/or offers for provider objects, according to a second standard type (e.g., which may be the same or different from the first standard type). Neither standard type may be compatible with a format used by the client device 104 to communicate. As such, the intermediation server 108 may convert data received in different formats from the provider system 102, to a format compatible with the client device 104, and vice versa.

The client device 104, in the present example, may be operated by a travel agent entity, and therefore generates and provides requests for provider objects (e.g., representing products which may be for purchase), and/or requests to purchase products (e.g., represented by the provider objects), to the provider system 102, via the intermediation server 108, on behalf of end users (e.g., travelers).

Hence, in one example, the intermediation server 108 may comprise an aggregator server which communicates with a plurality of provider system 102 and aggregates provider objects and/or offers for provider objects from the plurality of provider system 102, to provide to the client device 104.

Alternatively, a client device 104 may be operated by a provider system 102. In yet another alternative, a provider system 102 may operate the intermediation server 108. Hence, it is understood that while the provider system 102, the client device 104 and the intermediation server 108 are all depicted as being separate from each other in FIG. 1, they may be associated with various combinations of one or more entities, and/or functionality of the provider system 102, the client device 104 and the intermediation server 108 may be combined in any suitable manner at one or more computing devices and/or servers and/or cloud computing devices. As such, herein, rather than refer to components of the system 100 communicating via transmitting data therebetween (e.g., such as via the network 106), herein communication between components of the system 100 is referred to as the components providing data, and the like, therebetween which may include, but is not limited to, transmitting data over the network 106, communicating data when the components are local to each other and/or combined, and the like.

Various other mechanisms for initiating the creation of the provider objects are also contemplated. For example, end users (via the client device 104 and/or client devices and/or additional computing devices, not shown in FIG. 1) may initiate the creation of the provider objects via direct interaction with a website hosted by the intermediation server 108. Various mechanisms for the creation of provider objects will be apparent to those skilled in the art, such as the "offer" and "order" mechanisms specified by the NDC standard. The creation of provider objects in response to product purchase requests is not discussed in further detail herein.

The client device 104 is configured to receive data contained in the provider objects via the intermediation server 108. Data obtained by the client device 104, via the intermediation server 108, may be presented to users served by the client device 104, for example via a display screen which may be local to the client device 104, for example see FIG. 4); further information associated with the items represented by the provider objects may be requested by the client device 104 which may include, but is not limited to the client device 104 ordering the items. In other words, the system 100 enables the client device 104 to request further information associated with the items represented by the provider objects, via the intermediation server 108. The client device 104 may be configured to request the further information and/or initiate such orders by providing requests to the provider system 102 via the intermediation server 108.

The provider objects provided by the provider system 102 generally include provider object data representing at least one item provided by the provider system 102. In some examples, the provider object data may include a provider object identifier and/or provider object identifier data, that identifies the provider object to the provider system 102. In particular examples related to the travel industry, the provider object data may generally comprise information that identifies a travel related product and/or service. Whether the provider object data includes a specific provider object identifier, or not may depend on whether a provider object is being in an NDC or GDS format. For example, when a provider object comprises an NDC offer, the provider object identifier data may comprise an identifier generated by the provider system 102 which specifically identifies the NDC offer. However, when a provider object comprises an Edifact recommendation, which generally does not include a specific identifier, the Edifact recommendation may be identified by the provider system 102 based on provider object identifier data such as characteristics of the Edifact recommendation such as a specific order and/or format of data of the Edifact recommendation.

In general, communication between the client device 104 and the intermediation server 108 occurs via a computing-process flow 110 implemented by the client device 104, and the intermediation server 108, such as an Applications Programming Interface (API), and the like. For example, during ordering of a provider object (e.g., booking a flight), communications between the client device 104 and the intermediation server 108 may be defined by the API. As depicted, the client device 104 and the intermediation server 108 may respectively implement client-side and server-side portions 110-1, 110-2 of the computing-process flow 110 that are complementary to each other. In particular, the intermediation server 108 may be implementing the server-side portion 110-2 of the computing-process flow 110 via a computing-process flow engine 112.

In particular, when the intermediation server 108 receives a communication from the client device 104, in conjunction with the client device 104 implementing the API, the intermediation server 108 is generally configured to understand and/or determine which step of the computing-process flow 110 is being implemented at the client device 104 to generate the communication.

The computing-process flow engine 112 may implement the server-side aspects of the computing-process flow 110, and may provide to the client device 104 a graphic user interface (GUI) and the like, for example via a browser application (not depicted) at the client device 104, which may enable the client device 104 to implement the client-side aspects of the computing-process flow 110.

As used herein, the term "engine" refers to hardware (e.g., a processor, such as a central processing unit (CPU), graphics processing unit (GPU), an integrated circuit or other circuitry) or a combination of hardware and software (e.g., programming such as machine- or processor-executable instructions, commands, or code such as firmware, a device driver, programming, object code, etc. as stored on hardware). Hardware includes a hardware element with no software elements such as an application specific integrated circuit (ASIC), a Field Programmable Gate Array (FPGA), a PAL (programmable array logic), a PLA (programmable logic array), a PLD (programmable logic device), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or implemented or interpreted by a processor), or hardware and software hosted at hardware.

It is further understood that, in some examples, the intermediation server 108 and/or one or more of the provider systems 102 operate according to a given standard, such as GDS, NDC, and the like, and hence, the computing-process flow 110 may operate according to the given standard. Hence it may be challenging, if not impossible, to modify the computing-process flow 110, at least not without significant use of processing resources in the system 100. However, there may be situations where modifications and/or additions to the computing-process flow 110 may be necessary, but currently there is no efficient way of providing such modifications and/or additions within a standard. In particular, a given provider system 102 may provide certain types of information and/or provider objects which may not be available via the computing-process flow 110. In particular, when the intermediation server 108 and/or one or more of the provider systems 102 operate according a GDS-based data exchange, such modifications and/or additions may be particularly challenging.

As such, as will be described herein, the intermediation server 108 may implement a computing module engine 114, which may be used to implement a computing module provided by a provider system 102 to provide certain types of information and/or provider objects which may not be available via the computing-process flow 110, for example via a data pathway between a client device 104 and a provider system 102. The computing module may enable modification of given data used in the computing-process flow 110 to include information and/or provider objects (e.g., provider object data), and the like, that are compatible with the computing-process flow 110, but which may not be available via the computing-process flow 110.

In particular, the computing module engine 114 is understood to be isolated from other components of the intermediation server 108 implementing the computing-process flow 110, such as the computing-process flow engine 112.

Figure 2:
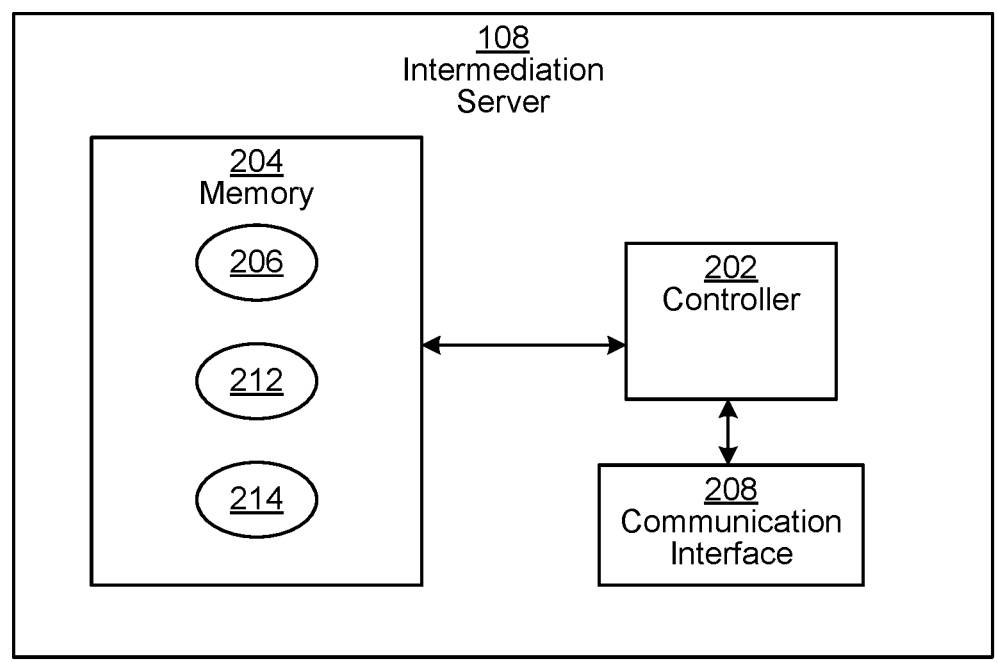
FIG. 2 depicts an intermediation server for controlling operation of a client device, according to non-limiting examples.

Turning to FIG. 2, before discussing the functionality of the system 100 in greater detail, certain components of the intermediation server 108 will be discussed in greater detail. While depicted as one device, the intermediation server 108 may comprise one or more computing devices and/or one or more cloud computing devices that may be geographically distributed.

As shown in FIG. 2, the intermediation server 108 includes at least one controller 202, such as a central processing unit (CPU) or the like. The controller 202 is interconnected with a memory 204 storing an application 206, the memory 204 implemented as a suitable non-transitory computer-readable medium (e.g., a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 202 and the memory 204 are generally comprised of one or more integrated circuits (ICs).

The controller 202 is also interconnected with a communication interface 208, which enables the intermediation server 108 to communicate with the other computing devices of the system 100 (i.e. the provider systems 102 and the client device 104) via the network 106, though it is understood such communication may occur locally when components of the system 100 are combined. The communication interface 208 therefore may include any necessary components (e.g., network interface controllers (NICs), radio units, and the like) to communicate via the network 106. The specific components of the communication interface 208 may be selected based on upon the nature of the network 106 and/or local communication between components of the system 100, and the like. The intermediation server 108 may also include input and output devices connected to the controller 202, such as keyboards, mice, displays, and the like (not shown).

The components of the intermediation server 108 mentioned above may be deployed in a single enclosure, or in a distributed format. In some examples, therefore, the intermediation server 108 includes a plurality of processors, either sharing the memory 204 and communication interface 208, or each having distinct associated memories and communication interfaces. As such, it is understood that the memory 204, and/or a portion of the memory 204, may be internal (e.g., as depicted) or external to the intermediation server 108; regardless, the controller 202 is understood to have access to the memory 204.

The memory 204 also stores a plurality of computer-readable programming instructions, executable by the controller 202, in the form of various applications, including the application 206. As depicted, the memory 204 may store further applications 212, 214 which may respectively correspond to instructions for implementing the engines 112, 114. While the applications 212, 214 are depicted as separate from the application 206, in some examples the applications 206, 212, 214 may be combined in any suitable manner.

Figure 5:
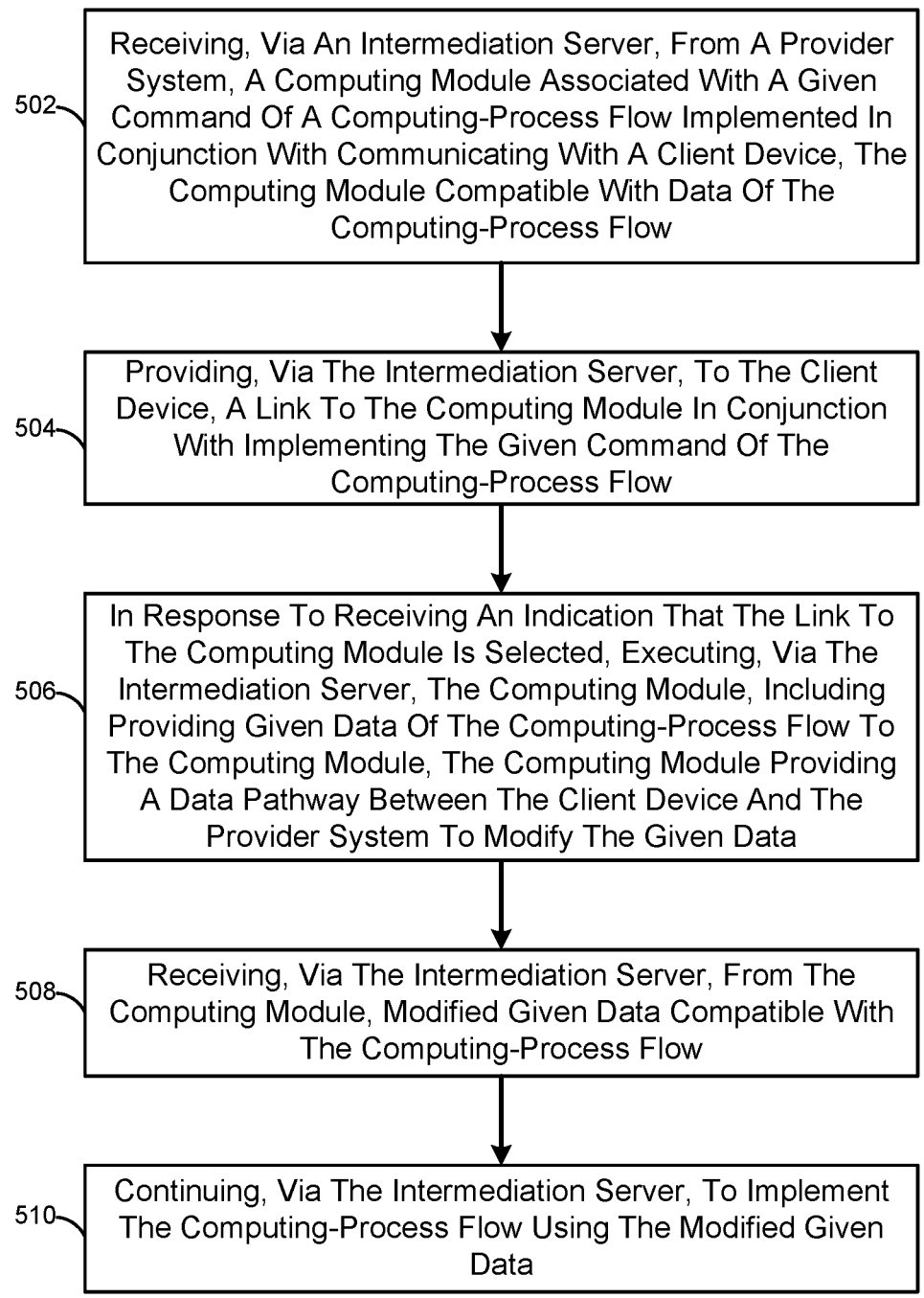
FIG. 5 depicts a method for providing a data pathway between a client device and a provider system, according to non-limiting examples.

As will be understood by those skilled in the art, the controller 202 executes the instructions of the application 206 (and any other suitable applications 212, 214) in order to perform a set of operations defined by the instructions contained therein including, but not limited to, the blocks of a method described with respect to FIG. 5. In the description below, the controller 202, and more generally the intermediation server 108, and/or the engines 112, 114, are understood to be configured to perform those actions. It will be understood that they are so configured via the execution (by the controller 202) of the instructions of the applications stored in the memory 204. Put another way, the intermediation server 108 may comprise a computer-readable storage medium (e.g., a non-transitory computer-readable storage medium) having stored thereon program instructions that, when executed by the controller 202, causes the controller 202 to perform a set of operations comprising the blocks of the method described with respect to FIG. 5.

While structure of the provider system 102 and the client device 104 is not described in detail, the provider system 102 and the client device 104 are understood to have a similar structure as the intermediation server 108, but adapted for the functionality of the provider system 102 and the client device 104. In a particular example, the client device 104 is understood to comprise, and/or have access to, a display screen and an input device (e.g., see FIG. 4); similarly, a controller of the client device 104 is understood to implement the computing-process flow 110.

Figure 3:
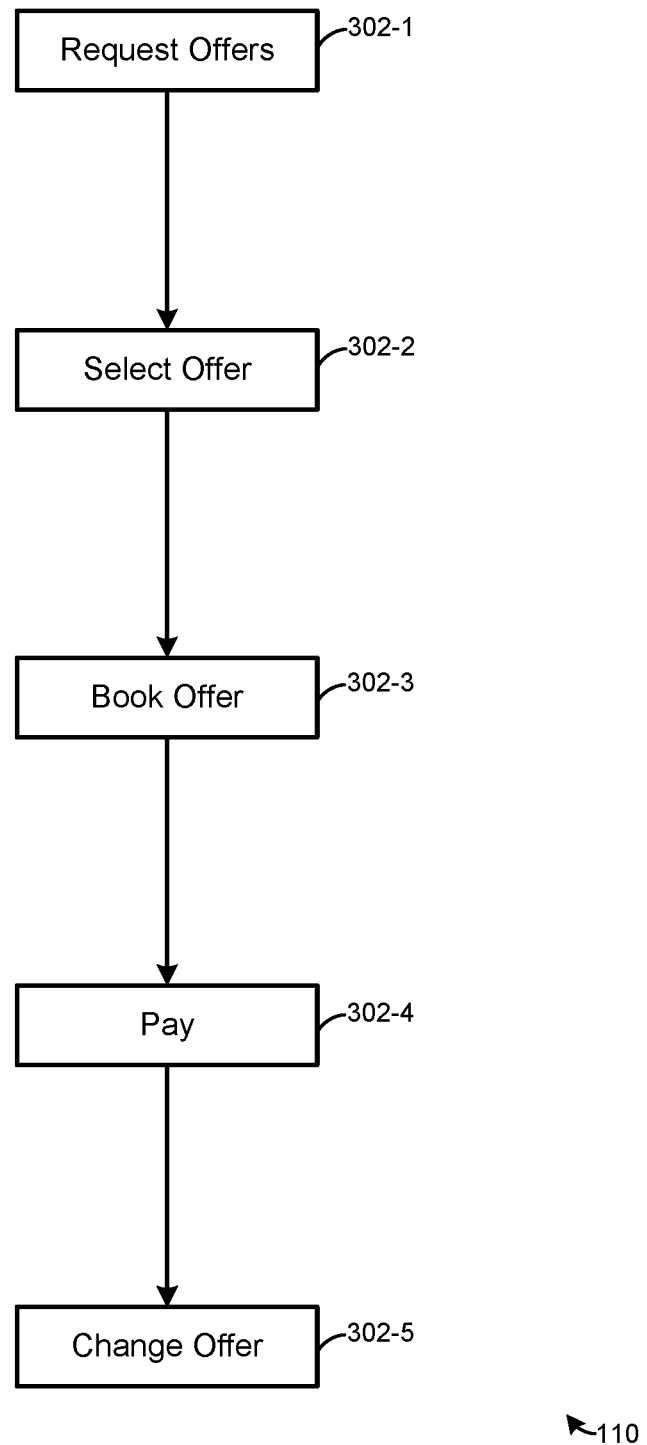
FIG. 3 depicts a computing-process flow implemented at a client device of the system of FIG. 1, according to non-limiting examples.

Attention is next directed to FIG. 3 which depicts a block diagram of an example of the computing-process flow 110.

While the example computing-process flow 110 is depicted in the form of a flow chart, it is understood that the example computing-process flow 110 (e.g., hereafter the computing-process flow 110) may shows steps of an API that include steps 302-1, 302-2, 302-3, 302-4, and optional step 302-5. The steps 302-1, 302-2, 302-3, 302-4, 302-5 are hereafter interchangeably referred to, collectively, as the steps 302 and, generically, as a step 302. This convention will be used throughout the present specification.

Furthermore, the term "steps" as used herein, may be understood to include steps of the computing-process flow 110 that are implemented at the client device 104 when the client device 104 implements the computing-process flow 110, for example according to a given standard. Continuing with a travel industry example, as depicted, the computing-process flow 110 represents steps 302 for: requesting (e.g., the step 302-1) offers for flights (e.g., provider objects); selecting (e.g., the step 302-2) an offer of a flight (e.g., a provider object) to be booked; booking (e.g., the step 302-3) a selected offer of a flight (e.g., a provider object); and paying (e.g., the step 302-4) for the selected offer of a flight (e.g., a provider object) that is being booked. At an optional change offer step 302-5, the offer may be changed. While the change offer step 302-5 is depicted as following the pay step 302-4, the change offer step 302-5 may be available at, and/or after, any of the select offer step 302-2, the book offer step 302-3, and the pay step 302-4. Hence, in particular, each of the steps 302 must be implemented to book an offer of a flight (e.g., book a seat on a flight), and in the depicted order (other than the change offer step 302-5 which may be implemented at and/or after any suitable step 302 of the computing-process flow 110.

Furthermore, it is understood that a step 302 may be further associated with a respective graphic user interface (GUI) that may be rendered at a display screen associated with the client device 104.

For example, at the step 302-1, a user of the client device 104 may enter criteria at data fields of a GUI used for searching for offers of flights, such as a date for a flight, a departure airport, an arrival airport, among other possibilities flight to book; the criteria may be provided to the intermediation server 108, and to the provider systems 102, which may return respective offers of flights that meet the criteria.

Similarly, at the step 302-2, a list of offers of the flights returned by the provider systems 102 may be provided in a GUI at a display screen, and from which a user of the client device 104 may select a flight to book, and from which a user of the client device 104 may select electronic buttons, and the like to add a service to an offer, such as a pickup service.

Similarly, at the step 302-3, information for a selected flight may be provided in a GUI at a display screen, and from which a user of the client device 104 may select electronic buttons to book the flight, and/or to add a service to a booking, such as a pickup service, and the like.

Similarly, at the step 302-4, fields for entering payment information, such as credit card information, to pay for a selected flight being booked may be provided in a GUI at a display screen.

Similarly, at the step 302-5, any suitable information of a selected flight may be changed, and fields for changing such suitable information may be provided in a GUI at a display screen. Furthermore, such information that may be changed may depend at which step 302 the step 302-5 is being implemented (e.g. and/or after [at] which step 302 the step 302-5 is being implemented). For example, before and after a flight is booked and paid for, an airline may have restrictions on what can be changed in the booking, and fields for information that can be changed may be provided accordingly at the GUI. Such a GUI for the step 302-5 may be combined with any suitable GUI of the other steps 302.

Figure 4:
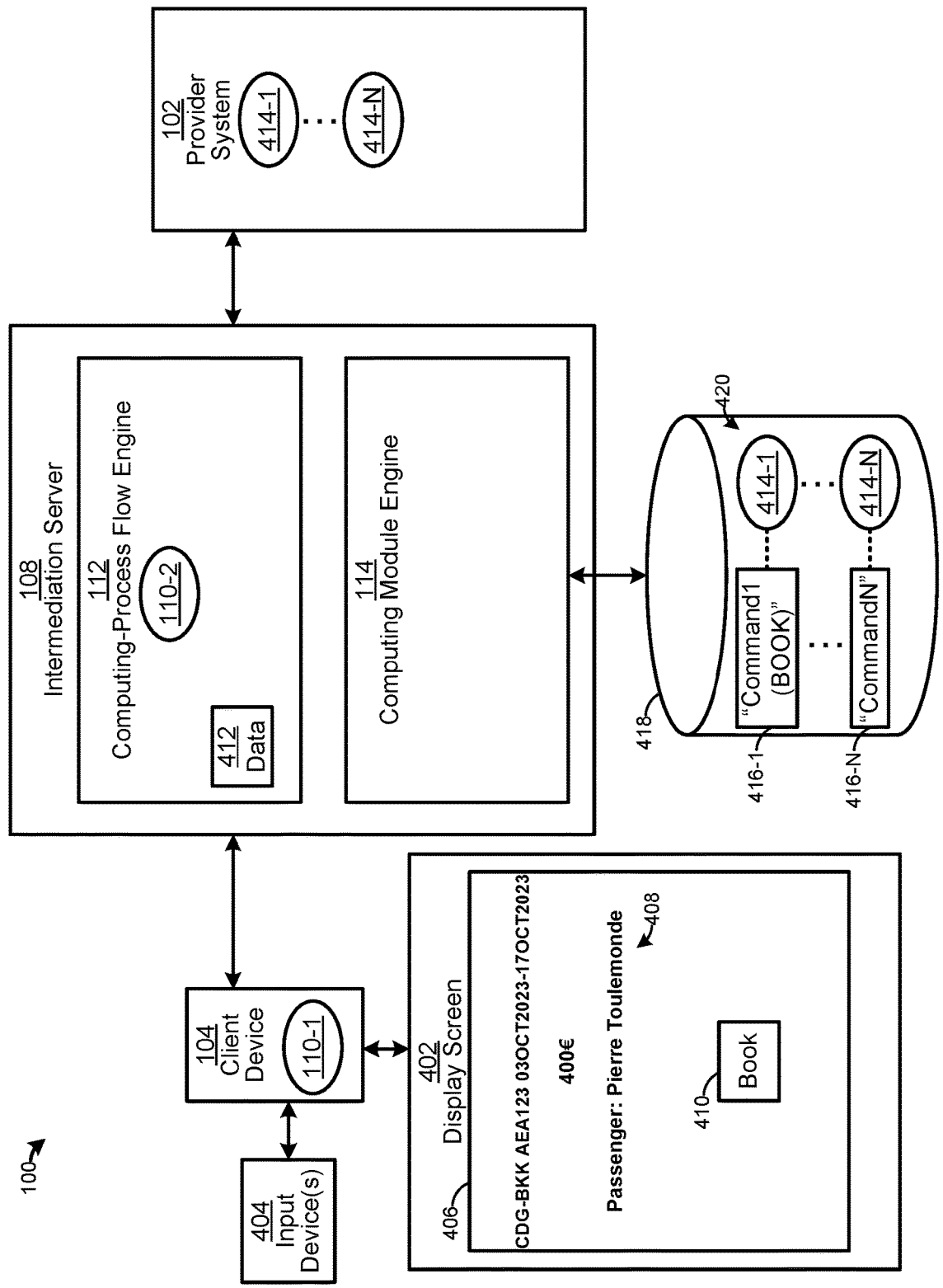
FIG. 4 depicts the system of FIG. 1 in further detail, according to non-limiting examples.

Attention is now directed to FIG. 4, which depicts aspects of one example of the system 100 that includes a provider system 102, a client device 104, and the intermediation server 108, the intermediation server 108 in communication with the client device 104, and the provider system 102 (e.g., which, may include, but is not limited to, a servers (or a combinations of servers and/or cloud computing devices). In some examples, the provider system 102 may be operated by an airline.

While the network 106 is not depicted, it is nonetheless understood to be present. For example, communication links between components of the system 100 are depicted in FIG. 4, and throughout the present specification, as double-ended arrows between respective components; the communication links may include any suitable combination of wireless and/or wired links and/or wireless and/or wired communication networks including, but not limited to, the network 106.

Furthermore, as depicted, the client device 104 is in communication with a display screen 402 and one or more input devices 404, such as any suitable combination of a keyboard, a pointing device (e.g., a mouse), a voice recognition device, and the like. While only one provider system 102 and one client device 104 is depicted, the system 100 may comprise any suitable respective numbers of provider systems 102 and client devices 104.

Also depicted in FIG. 4, the client device 104 is implementing the client-side portion 110-1 of the computing-process flow 110, the intermediation server 108 is implementing the engines 112, 114, and, in particular, the computing-process flow engine 112 is implementing the server-side portion 110-2 of the computing-process flow 110.

In particular, as depicted at the display screen 402, a GUI 406 is implemented at which information 408 associated with the step 302-3 (e.g., a booking step) is provided. The information 408 may comprise provider object data which defines a particular provider object. As such, in the depicted example, and continuing with a travel-industry based example, it is understood that steps 302-1, 302-2 have already occurred such that flights (e.g., provider object data) have been requested (e.g., at the step 302-1) and provided, and a particular flight has been selected (e.g., at the step 302-2). For example, the information 408 relates to a return flight between Charles De Gaulle ("CDG") airport and Bangkok ("BKK") airports from Oct. 3, 2023 ("03OCT2023") to Oct. 17, 2023 ("17OCT2023"), on a flight having a flight number "AEA123", a cost of 400 €, and for a passenger "Pierre Toulemonde". To book the flight (e.g., to proceed to the step 302-4), the GUI 406 includes an electronic button 410, which, when actuated, may implement a command of "BOOK", of the computing-process flow 110, to book the flight, for example to proceed to the step 302-4 to pay for the flight. The command of "BOOK" may be defined by a standard of the computing-process flow 110.

It is understood that the GUI 406 is generally simplified from an actual GUI used in booking flights however; as such, the GUI 406 may have any suitable format, and may include other electronic buttons, for example to select options for the flight (e.g., for seat selection, fare grade selection, meal selection, and the like) and/or add services to the flight (e.g., lounge access, airport transportation, and the like). Such electronic buttons may be associated with other commands of the computing-process-flow 110, and may be defined by a standard of the computing-process flow 110.

In conjunction with implementing the computing-process flow 110, the intermediation server 108 maintains given data 412, which, for example, includes indications of the information 408, as well any other suitable provider object data, such as an identifier of the provider system 102 providing the flight, an indication of a current step 302 of the computing-process-flow 110, and/or any other suitable information related to the computing-process-flow 110, such as identifiers of any provider objects represented by the given data 412. In some examples, the given data 412 may include information associated with the client device 104, such as an identifier of the client device 104 (e.g., a network address), a geographic location of the client device 104, a resolution of the display screen 402, and the like. Such information associated with the client device 104 may be determined when establishing communications with the client device 104, for example during, or prior to, implementation of the computing-process flow 110, and/or the client device 104 may register with the intermediation server 108 and provide such information.

Furthermore, while the given data 412 is depicted one set of data, the given data 412 may comprise a plurality of sets of data for the different types of information described above. In particular, the given data 412 may comprise one set of data for provider object data, and at least one other set of data associated with the client device 104 and/or the provider system 102.

While the given data 412 is depicted as being "in" the computing-process flow engine 12, the given data 412 may alternatively be stored at the memory 204 and/or at any other suitable memory of the system 100.

FIG. 4 further depicts a plurality of computing modules 414-1 . . . 414-N at the provider system 102 (e.g., the computing modules 414 and/or a computing module 414). It is understood that a computing module 414 may be implemented by the computing module engine 114, to modify the given data 412 in a manner which is compatible with the computing-process flow 110, and a particular computing module 414 may be associated with a given command of the computing-process flow 110.

For example, as depicted, the intermediation server 108 is understood to have received the computing modules 414 from the provider system 102 in association with respective given commands, for example as indicated by respective dashed lines between the computing modules 414 and indications of associated given commands 416-1 . . . 416-N (e.g., given commands 416 and/or a given command 416). The computing modules 414 and the indications of associated given commands 416 are stored at a memory 418 accessible to the intermediation server 108 and/or at least the computing module engine 114. It is understood that while hereafter, the present specification will refer to a given command 416 stored at the memory 418, a given command 416 stored at the memory 418 is not a command, but rather an indication thereof.

Population of the memory 418 may occur, in some examples, by way of the provider system 102 populating the computing modules 414 in association with the given commands 416 at the memory 418. Hence, while the given commands 416 are not depicted at the provider system 102, the provider system 102 is understood to have access to the given commands 416 and associate a particular computing module 414 with a particular command 416, for example during the population process. It is understood that the memory 418 may be a component of infrastructure of the intermediation server 108, and hence population of the memory 418 may occur via the intermediation server 108.

In particular, the memory 418 may a store an association table 420 between the plurality of given commands 416 of the computing-process flow and the plurality of computing modules 414.

In some examples, the given commands 416 may appear and/or be associated with respective identifiers of particular browser data and/or display pages of the GUI 406, that may be particular to a given step 302 of the computing-process flow 110. In these examples, the association table 420 may between such respective identifiers and respective computing modules 414, and/or the association table 420 may between such respective identifiers, respective given commands 416 and respective computing modules 414. Regardless, it is understood that even when the association table 420 is between such respective identifiers of particular browser data and/or display pages and respective computing modules 414, the respective computing modules 414 are associated with given commands, such as a command to retrieve the particular browser data and/or display pages of the GUI 406 identified by a respective identifier (e.g. associated with a respective computing module 414).

However, in particular examples, and as previously mentioned, indications of the given commands 416 stored at the memory 418 may comprise respective indications of which command of the computing-process flow 110 an associated computing module 414 relates to. For example, as depicted, a first given command 416-1 (e.g., "Command1") comprises an indication of "BOOK", which indicates that, when a command of "BOOK" occurs at the computing-process flow 110, a link to the computing module 414-1 may be provided to the client device 104, such that, when the link is selected at the client device 104, the associated computing module 414-1 may be implemented via the intermediation server 108, for example at the computing module engine 114. While for simplicity the Nth given command 416-N (e.g., "CommandN") does not specifically comprise an indication a command of the computing-process flow 110, it is understood that such an indication is nonetheless present (e.g., such as a pay command, and the like).

Alternatively, or in addition, and as previously described, the given commands 416 may identify particular browser data and/or display pages of the GUI 406 that are to be retrieved when, for example, implementing the computing-process flow 110. For example, the first given command 416-1 may identify particular browser data and/or display pages of the GUI 406 that are to be provided to the client device 104 when a command of "BOOK" occurs at the computing-process flow 110. Indeed, in some examples, more than one command 416 may be associated with one particular set of browser data and/or display page of the GUI 406, and the association table 418 may store such associations, such that when a particular set of browser data and/or display page of the GUI 406 is provided to the client device 104, and/or a particular step 302 of the computing-process flow 110 is implemented (e.g. as stored in the data 412), the intermediation server 108 and/or the computing-process flow engine 112 may determine which of the given commands 416 may be implemented in association with that particular set of browser data and/or display page, to better locate associated given commands 416 and respective computing modules 414 at the association table 420.

In particular, a computing module 414 is understood to comprise computer code and/or program instructions that, when executed by the computing module engine 114 (e.g., and/or a controller thereof), causes the computing module engine 114 to perform a set of operations as described herein, for example in conjunction with implementing the method of FIG. 5, for example to modify the given data 412 outside of the computing-process flow 110, but in a manner compatible with the computing-process flow 110, as described herein.

Furthermore, a number "N" of computing modules 414 and associated given commands 416 may be as few as "1", however, the number "N" of computing modules 414 and associated given commands 416 may be greater than "1" and/or any suitable number.

Furthermore, while not depicted, more than one computing module 414 may be associated with one given command 416. For example, as the association between given commands 416 and computing modules 414 at the memory 418 may result in a link to a respective computing module 414 being provided to the client device 104 (e.g., in the GUI 406), when an associated given command 416 is implemented in the computing-process flow 110, more than one computing module 414 may be associated with a given command 416. As such, when a given command 416 is implemented in the computing-process flow 110 that is associated with a plurality of computing modules 414, respective links to the plurality of computing modules 414 may be provided to the client device 104.

Regardless, when a link to a computing module 414 is selected, the computing module 414 may be executed via the implementation server 108, for example by the computing module engine 114, which may include providing the given data 412 of the computing-process flow 110 to the computing module 414. The computing module 414 further provides a data pathway between the client device 104 and the provider system 102 (e.g., from which the computing module 414 was received) to modify the given data 412, as described herein. Such modification is understood to occur outside of the computing-process flow 110, however such modification is understood to generate modified given data compatible with the computing-process flow 110. Such a modification may occur via receiving, at the computing module 414, input from one or more of the client device 104 and the provider system 102 that is processed by the computing module 414-1 in conjunction with modifying the given data. Alternatively, and/or in addition, such a modification may occur providing, from the computing module 414-1, to the provider system 102, the given data 412 which returns the modified given data.

Furthermore, such a modification may occur in conjunction with executing the computing module 414 by, providing, to the client device 104, a respective GUI for receiving input to modify the given data 412 used by the computing-process flow 110, the respective GUI comprising a component of the data pathway between the client device 104 and the provider system 102. In particular, the respective GUI may be provided on top of the GUI 406, and/or as an overlay to the GUI 406, as described herein.

Such a modification may include adding indications (e.g., provider object data) of one or more provider objects to the given data 412 that may not otherwise be available via the computing-process flow 110. For example, such indications of the one or more provider objects may represent given goods and/or services provided by the provider system 102 outside of the computing-process flow 110, for example as selected by the client device 104.

Regardless of how such a modification occurs, modified given data output by the computing module 414 is understood to be compatible with the computing-process flow 110. Put another way, while additional fields may be added to the modified given data, relative to the given data 412, which may be populated with indications of the one or more provider objects added to the given data 412, a format, number, etc. of such additional fields are compatible with the computing-process flow 110. Furthermore, a price in the given data 412 may be modified to include cost of the one or more provider objects represented by the indications of the one or more provider objects added to the given data 412.

The computing-process flow 110 may then continue using the modified given data.

Put another way, the computing-process flow 110 may be paused while the computing module 414 is implemented.

Furthermore, when the computing-process flow 110 continues, and/or implementation of the computing module 414 ends, the data pathway between the client device 104 and the provider system 102 may be terminated.

It is further understood that the system 100 depicted in FIG. 4 may be modified in any suitable manner. For example, while as depicted the engines 112, 114 are implemented by a single instantiation of the intermediation server 108, in other examples the engines 112, 114 are implemented by different instantiations of the intermediation server 108 (e.g., by different virtual machines associated with the intermediation server 108). Similarly, while the memory 418 is depicted as being separate from the intermediation server 108, the memory 418 may be a component of the intermediation server 108, though population of the memory 418 by the provider system 102 may occur via yet another virtual machine associated with the intermediation server 108. Indeed, the intermediation server 108 may include, but is not limited to, an intermediation system comprising any suitable number of virtual machines, and/or cloud computing devices, to implement functionality as described herein.

Attention is now directed to FIG. 5 which depicts a flowchart representative of a method 500 a method for providing a data pathway between a client device and a provider system. The operations of the method 500 of FIG. 5 correspond to machine readable instructions that are executed by the intermediation server 108, and specifically the controller 202 of the intermediation server 108. In the illustrated example, the instructions represented by the blocks of FIG. 5 are stored at the memory 204 for example, as the applications 206, 212, 214. The method 500 of FIG. 5 is one way in which the controller 202 and/or the intermediation server 108 and/or the system 100 may be configured. Furthermore, the following discussion of the method 500 of FIG. 5 will lead to a further understanding of the system 100, and its various components.

The method 500 of FIG. 5 need not be performed in the exact sequence as shown and likewise various blocks may be performed in parallel rather than in sequence. Accordingly, the elements of method 500 are referred to herein as "blocks" rather than "steps." The method 500 of FIG. 5 may be implemented on variations of the system 100 of FIG. 1 and FIG. 4, as well.

Furthermore, the method 500 of FIG. 5 will be described with respect to the example of the system 100 depicted in FIG. 4 and more specifically with respect to the computing module 414-1 and the associated given command 416-1.

Furthermore, at the method 500, one or more of the intermediation server 108 and the provider system 102 may operate according to a GDS-based data exchange. While the intermediation server 108 and/or the provider system 102 may operate according to any other suitable standard, including, but not limited to an NDC-based data exchange, modifying GDS-based data exchanges may be particularly challenging.

At a block 502, the controller 202, and/or the intermediation server 108, receives, from the provider system 102, a computing module 414-1 (e.g., and/or any of the computing module 414) associated with a given command 416-1 of a computing-process flow 110 implemented in conjunction with communicating with the client device 104, the computing module 414-1 compatible with data of the computing-process flow 110.

At a block 504, the controller 202, and/or the intermediation server 108, provides, to the client device 104, a link to the computing module 414-1 in conjunction with implementing the given command 416-1 of the computing-process flow 110.

At a block 506, the controller 202, and/or the intermediation server 108, in response to receiving an indication that the link to the computing module 414-1 is selected, executes the computing module 414-1, including providing the given data 412 of the computing-process flow 110 to the computing module 414-1, the computing module 414-1 providing a data pathway between the client device 104 and the provider system 102 to modify the given data 412.

At a block 508, the controller 202, and/or the intermediation server 108, receives, from the computing module 414-1, modified given data compatible with the computing-process flow 110.

At a block 510, the controller 202, and/or the intermediation server 108, continues to implement the computing-process flow 110 using the modified given data.

Attention is next directed to FIG. 6, FIG. 7, FIG. 8, FIG. 9, FIG. 10, FIG. 11, FIG. 12, FIG. 13, FIG. 14, and FIG. 15 which depicts aspects of the method 500. FIG. 6, FIG. 7, FIG. 8, FIG. 9, FIG. 10, FIG. 11, FIG. 12, FIG. 13, FIG. 14, and FIG. 15 are understood to be similar to FIG. 4, with like components having like numbers.

Figure 6:
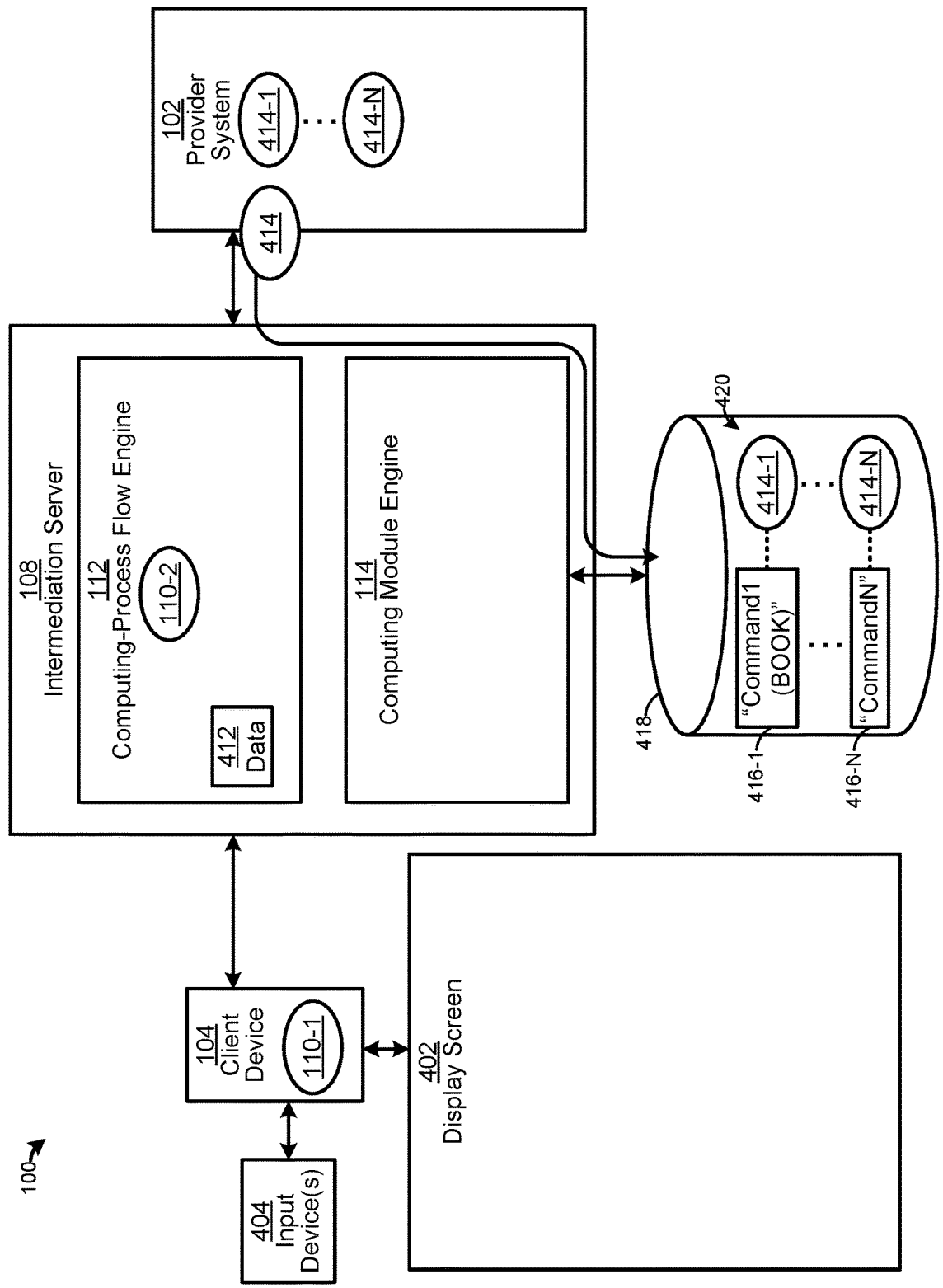
FIG. 6 depicts the system as depicted in FIG. 4 implementing aspects of a method for providing a data pathway between a client device and a provider system, according to non-limiting examples.

Attention is first directed to FIG. 6, which depicts the system 100 before implementation of the computing-process flow 110, hence the GUI 406 and the given data 412 are not depicted, though it is understood that the example of FIG. 6 may occur during implementation of the computing-process flow 110. In particular, FIG. 6 depicts the intermediation server 108 receiving (e.g., at the block 502 of the method 500), from the provider system 102, the computing modules 414 (e.g., including the computing module 414-1), which are used to populate the memory 418. While as depicted, all computing modules 414 may be received at once from the provider system 102, it is understood that one or more computing module 414 may be received and/or updated at any suitable time, such that the association table 420 may be maintained in any suitable manner.

Hence, for example, the method 500 may further comprise the controller 202 and/or the intermediation server 102 maintaining the association table 420 between the plurality of given commands 416 of the computing-process flow 110 and the plurality of computing modules 414 provided by the provider system 104, including the given command 416-1 associated with the computing module 414-1 (e.g., of the block 502 of the method 500). For example, when a computing module 414 is received from the provider system 102, the computing module 414 may be stored at the association table 420 in association with a given command 416 (e.g., and the provider system 102 may provide an indication of which given command, of the computing-process flow 110, the computing module 414 is to be associated with). Alternatively, and/or in addition, the provider system 102 may provide a computing module 414 that is to replace a computing module 414 already stored at the association table 420, and the association table 420 may be updated accordingly. Alternatively, and/or in addition, the provider system 102 may provide changes to a computing module 414 already stored at the association table 420, and computing module 414 already stored at the association table 420 may be updated accordingly using the provided changes. However, any suitable process for maintaining of the association table 420 is within the scope of the present specification.

Figure 7:
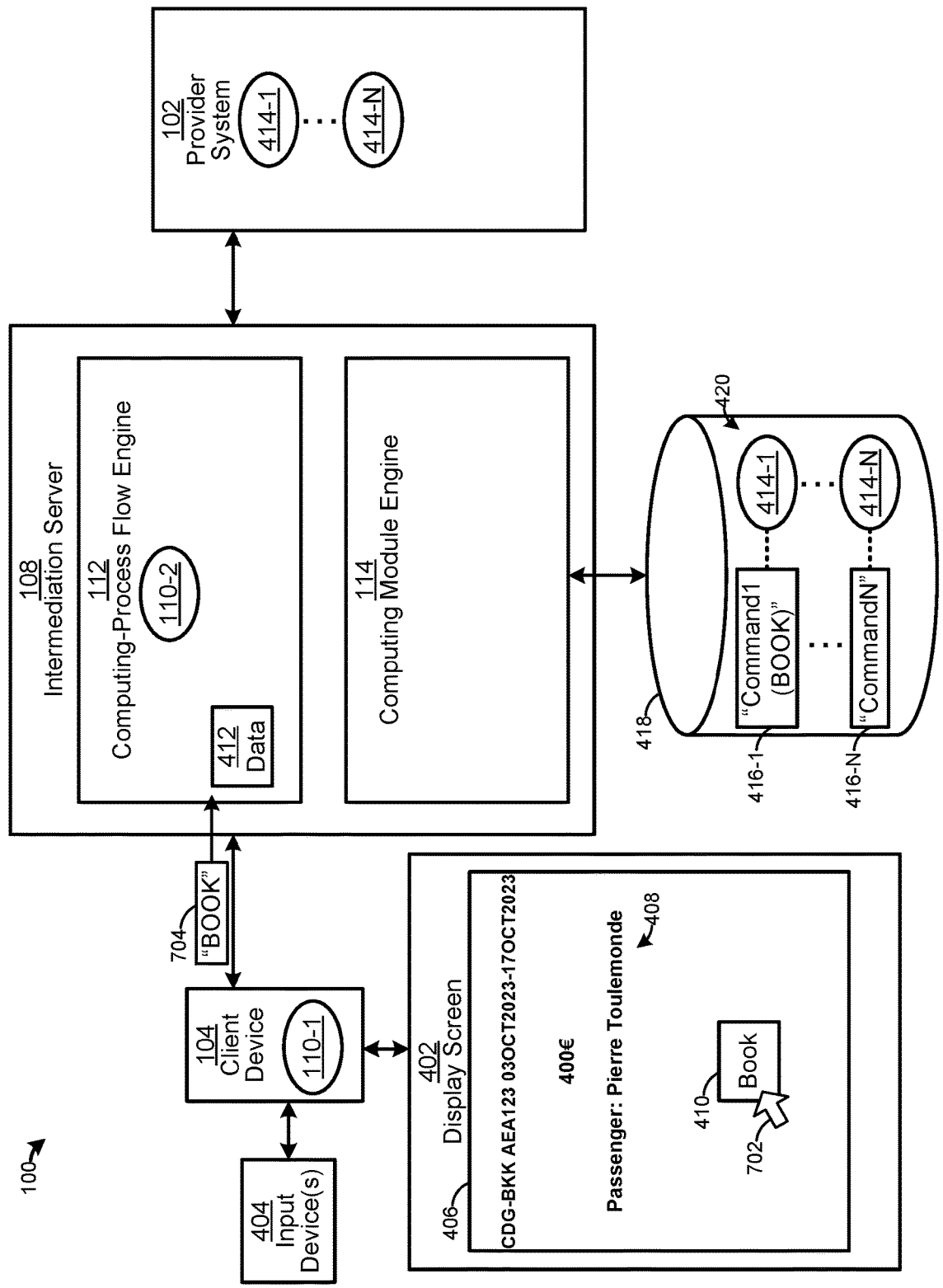
FIG. 7 depicts the system as depicted in FIG. 4 implementing further aspects of a method for providing a data pathway between a client device and a provider system, according to non-limiting examples.

Attention is next directed to FIG. 7, which depicts the computing-process flow 110 being implemented at the client device 104 and the intermediation server 108. In particular, similar to as depicted in FIG. 4, the step 302-3 is being implemented, the GUI 406 is provided, and the given data 412 has been generated.

As also depicted in FIG. 7, an input device 404 of the client device 104 may be operated to actuate the electronic button 410 via a pointer 702, for example to cause the client device 104 to provide, to the intermediation server 108, a command 704 of "BOOK", for example to book the flight indicated by the information 408 and/or the given data 412. It is understood that the command 704 corresponds to the given command 416-1 stored in the association table 420.

Figure 8:
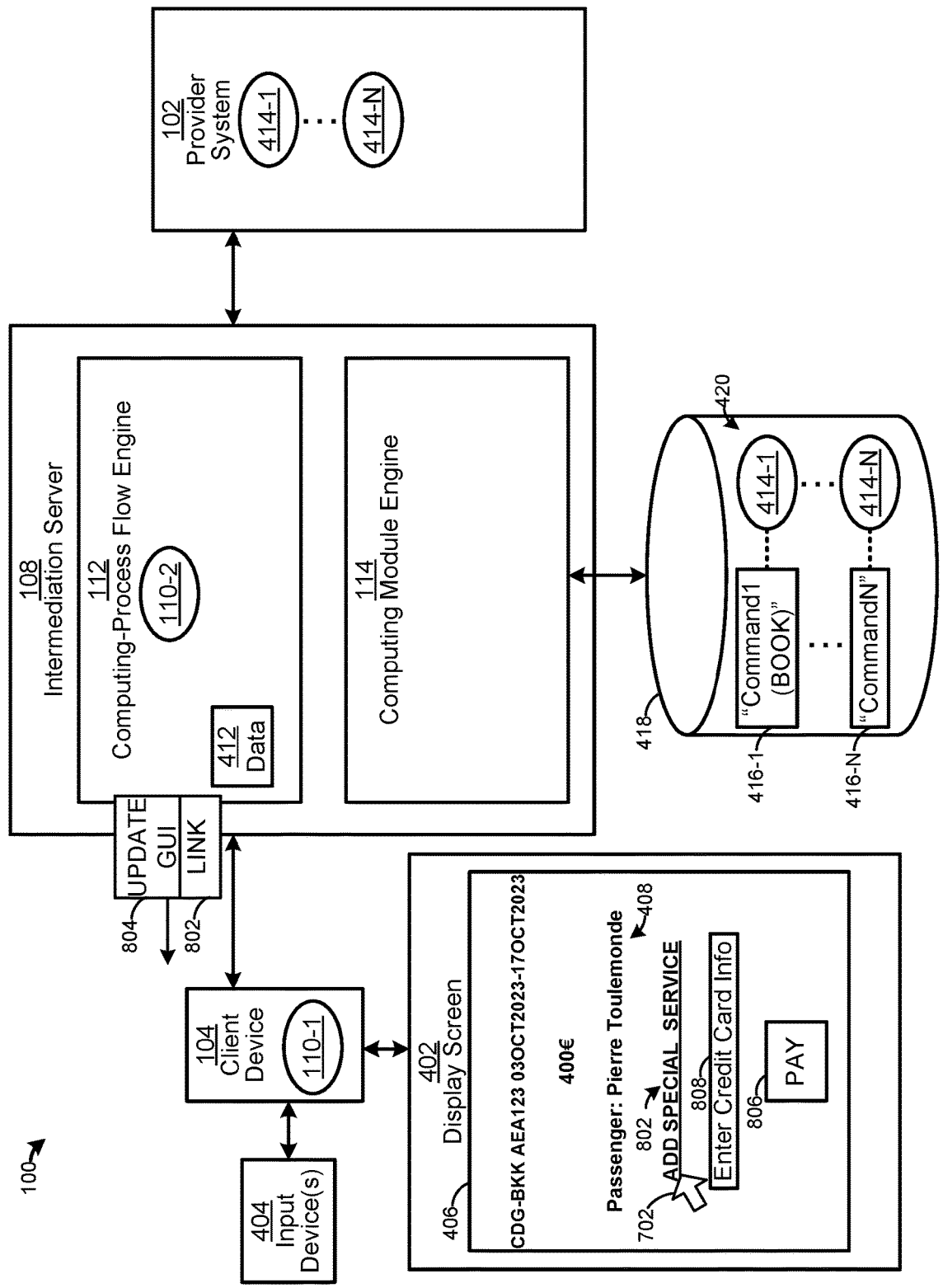
FIG. 8 depicts the system as depicted in FIG. 4 implementing further aspects of a method for providing a data pathway between a client device and a provider system, according to non-limiting examples.

Attention is next directed to FIG. 8, which depicts the intermediation server 108 providing (e.g., at the block 502 of the method 500), to the client device 104, a link 802 to the computing module 414-1 associated with the given command 414-1, in response to receiving the command 704, corresponding to the given command 414-1.

For example, as depicted, the link 802 may be provided in instructions 804, and the like, to update the GUI 406 to correspond to the step 302-4 of the computing-process flow 110. In some examples, the instructions 804 may comprise HTML (hyper-text mark up language) instructions that enables the client device 104 to update and/or regenerate the GUI 406 according to the step 302-4 of the computing-process flow 110, with the link 802 embedded in the updated GUI 406. However, other types of instructions 804 that embeds the link 802 in the GUI 406 are within the scope of the present specification.

For example, as depicted, the GUI 406 has been updated at the display screen 402 to correspond to the step 302-4 of the computing-process flow 110, and includes the information 408 as well as an electronic button 806 which may be actuated via the pointer 702 to pay for the flight indicated by the information 408. The GUI 406 further includes a field 808 to provide payment information, such as credit card number, and the like (e.g., as well as instructions to "ENTER CREDIT CARD INFO").

As depicted, the GUI 406 further includes the link 802 which comprises an actuatable link to the computing module 414-1 stored at the memory 418 and/or the association table 420. For example, the link 802 may comprise (e.g., embedded therein as metadata, and the like), a network address of the computing module 414-1 stored at the memory 418 and/or any other suitable information that identifies the computing module 414-1, such as an identifier of the computing module 414-1.

As depicted, the link 802 may further comprise text indicating a function of the computing module 414-1, for example, as depicted "ADD SPECIAL SERVICE" and/or any other suitable provider object available via the provider system 102. Such text may be retrieved from the computing module 414-1 (e.g., such text may be stored as metadata of the computing module 414-1), and the like. While the text "SPECIAL SERVICE" is generic, and not indicative of which provider object may be added to the flight, and added to the given data 412 as provider object data, in other examples the text may specifically indicate the provider object that may be added to the given data 412 via actuation of the link 802.

Figure 9:
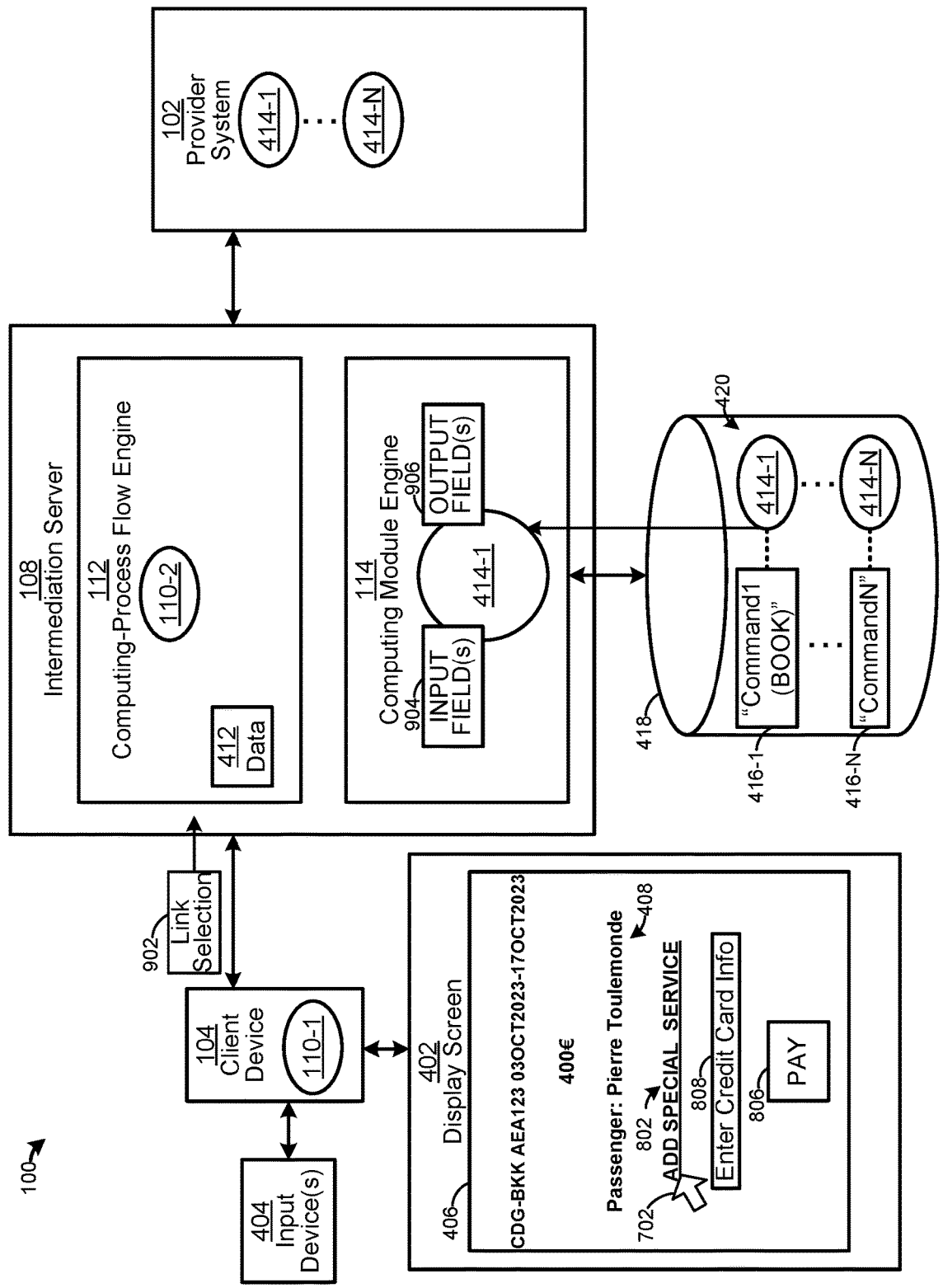
FIG. 9 depicts the system as depicted in FIG. 4 implementing further aspects of a method for providing a data pathway between a client device and a provider system, according to non-limiting examples.

Attention is next directed to FIG. 9, which depicts the pointer 702 being used to select the link 802 (e.g., the pointer 702 is used to "click" the link 802), which causes an indication 902 of a selection of the link 802 to be provided from the client device 104 to the intermediation server 108. The indication 902 may include the network address of the computing module 414-1 and/or any other suitable identifier of the computing module 414-1.

The intermediation server 108 receives the indication 902 that the link 802 to the computing module 414-1 is selected, and executes (e.g., at the block 506 of the method 500) the computing module 414-1.

For example, as depicted, the intermediation server 108 retrieves the computing module 414-1 from the memory 418, using any suitable information of the indication 902, and loads the computing module 414-1 into the computing module engine 114, to execute the computing module 414-1.

Put another way, the method 500 may further comprise the controller 202 and/or the intermediation server 108, in conjunction with implementing the computing-process flow 110, embedding, in the GUI 406, the link 802 to the computing module 414-1 in conjunction with implementing the given command 416-1; and providing the GUI 406 with the link 802, as embedded, to the client device 104. Furthermore, in some of these examples, receiving the indication 902 that the link 802 to the computing module 414-1 is selected may comprise receiving a selection of the link 802 embedded in the GUI 406 from the client device 104.

Furthermore, as will be presently explained, executing the computing module 414-1 may include providing the given data 412 of the computing-process flow 110 to the computing module 414-1, and the computing module 414-1 may generally provide a data pathway between the client device 104 and the provider system 102 to modify the given data 412. The given pathway is described in further detail with respect to FIG. 10.

FIG. 9 further illustrates that the method 500 may further comprise the controller and/or the intermediation server 108 implementing the computing module engine 114 to execute the computing module 414-1, the computing module engine 114 isolated from, and/or implemented, independent of other components of the intermediation server 108 implementing the computing-process flow 110. For example, the computing module engine 114 may be implemented independent of the computing-process flow engine 112, which may pause implementation of the computing-process flow 110 until modified given data is received from the computing module 414-1.

FIG. 9 depicts further details of the computing module 414-1. For example, as depicted the computing module 414-1 comprise one or more predefined input fields 904 and one or more predefined output fields 906. As will be presently explained, the given data 412 of the computing-process flow 110 may be provided to the computing module 414-1 via the one or more predefined input fields 904, and modified given data (e.g., as modified at the computing module 414-1) may be output at the one or more predefined output fields 906 and/or such modified given data may be received (e.g., by the intermediation server 108 and/or the computing-process flow engine 112) via the one or more predefined output fields 906.

For example, as previously described, the given data 412 may include, but is not limited to, indications of the information 408, an indication of a current step 302 of the computing-process-flow 110, information associated with the client device 104, such as an identifier of the client device 104 (e.g., a network address), a geographic location of the client device 104, a resolution of the display screen 402, an identifier of the provider system 102, identifiers of any provider objects represented by the given data 412, and the like. Such information may be used to populate respective input fields 904 of the computing module 414-1.

Put another way, one or more first input fields 904, of the one or more input fields 904, may be dedicated to receiving the information 408 and/or provider object data, one or more second input fields 904, of the one or more input fields 904, may be dedicated to receiving an indication of a current step 302 of the computing-process-flow 110, and one or more third input fields 904, of the one or more input fields 904, may be dedicated to information associated with the client device 104 and the provider system 102, and the like.

However, a number of the input fields 904 may be greater than a number of the output fields 906. For example, an indication of a current step 302 of the computing-process-flow 110, and information associated with the client device 104 and the provider system 102 may be used by the computing module 414-1 to implement certain aspects of communication with the client device 104 and/or the provider system 102, but such information is not modified by the computing module 414-1. However, the information 408 may be modified by the computing module 414-1 and hence a modified version of the given data 412, and/or a subset of the given data 412, may be output via the one or more output fields 906.

For example, one or more output fields 906 may be dedicated to outputting the information 408 as modified, for example as modified given data, as described herein.

Figure 10:
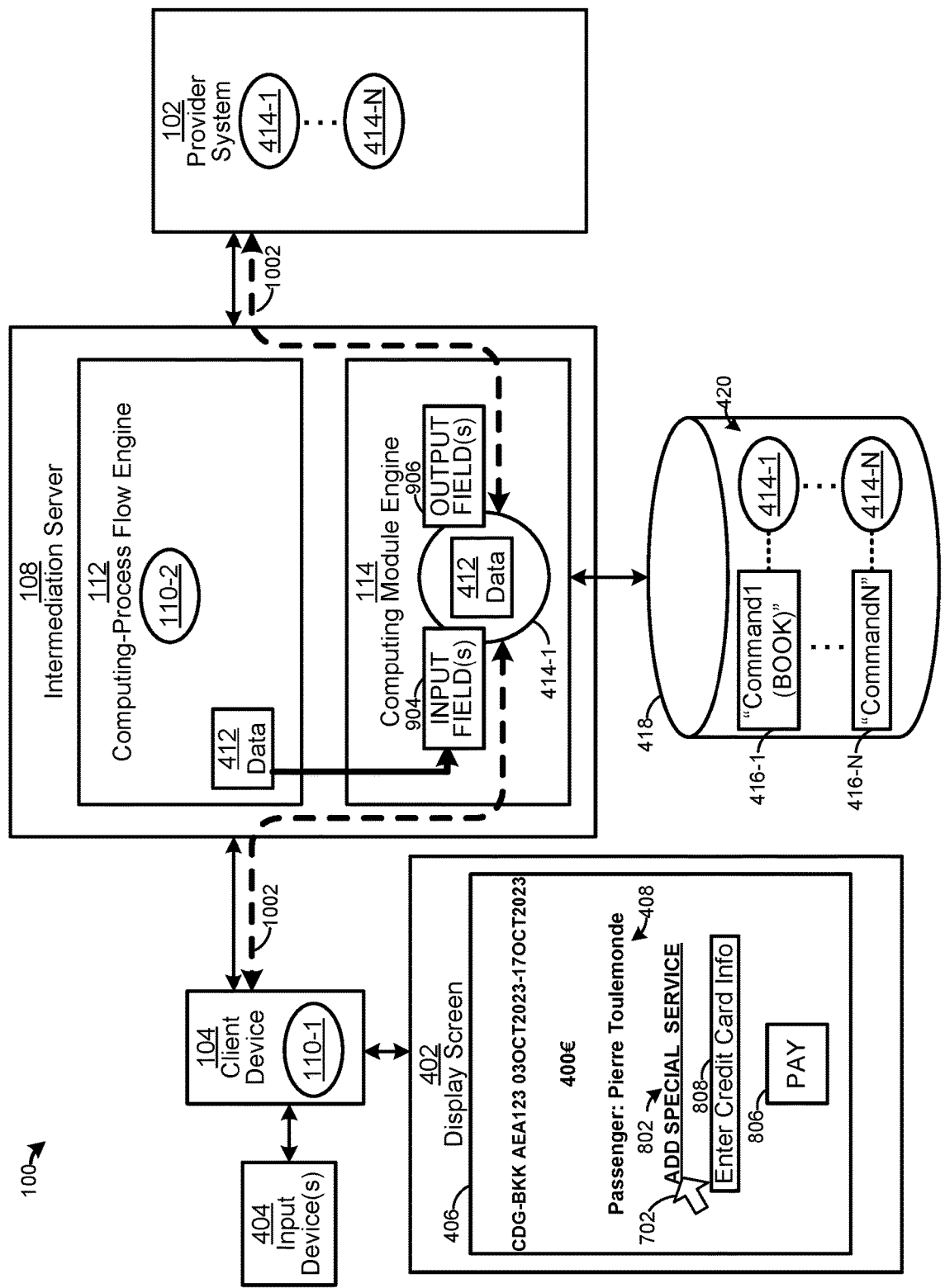
FIG. 10 depicts the system as depicted in FIG. 4 implementing further aspects of a method for providing a data pathway between a client device and a provider system, according to non-limiting examples.

Attention is next directed to FIG. 10 which depicts the given data 412 being input to the computing module 414-1, from the computing-process flow engine 112, via the one or more input fields 904.

FIG. 10 further depicts a data pathway 1002 between the client device 104 and the provider system 102, which may be established via the computing module engine 114 processing the computing module 414-1, as well as the given data 412, and the like. For example, the given data 412 may comprise respective identifiers of the client device 104 and the provider system 102, such as network addresses thereof, which may be used to establish the data pathway 1002. While each section of the data pathway 1002 may be independent of each other, such that the client device 104 and the provider system 102 may be communicating via the computing module 414-1 and not directly with each other, in other examples, the client device 104 and the provider system 102 may be communicating directly with each other via the data pathway 1002, with the computing module 414-1 processing input and/or other information, received from one or more of the client device 104 and the provider system 102 to modify the given data 412.

While as depicted, the data pathway 1002 may be via respective communication links between the intermediation server 108 and each of the client device 104 and the provider system 102, the data pathway 1002 may be established in any suitable manner.

Regardless, the data pathway 1002 is understood to exclude the computing-process flow engine 112, and is established independent of the computing-process flow 110. Indeed, the computing-process flow 110 may be paused while the data pathway 1002 is being implemented and/or until the computing module 414-1 outputs modified given data.

Figure 11:
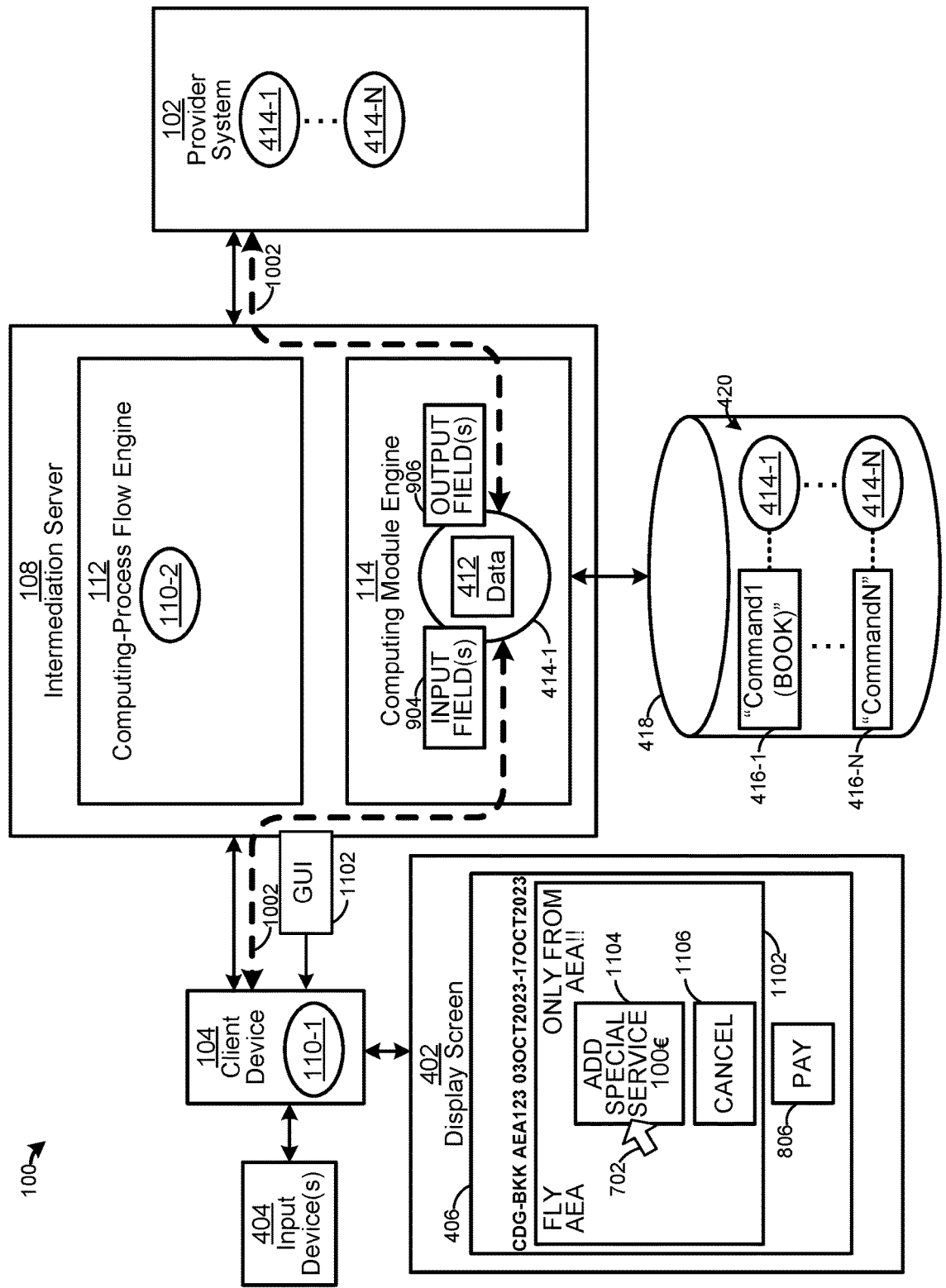
FIG. 11 depicts the system as depicted in FIG. 4 implementing further aspects of a method for providing a data pathway between a client device and a provider system, according to non-limiting examples.

Attention is next directed to FIG. 11, which depicts an example of how input may be received at the computing module 414-1 from the client device 104.

In particular, the method 500 may further comprise the controller 202 and/or the intermediation server 108, in conjunction with executing the computing module 414-1, providing, to the client device 104, a respective GUI 1102 for receiving input to modify the given data 412 used by the computing-process flow 110; the respective GUI 1102 may be further for providing the input (e.g., from the client device 104) to modify the given data 412 via the data pathway 1002 between the client device 104 and the provider system 102.

For example, as depicted, the respective GUI 1102 may be provided to the client device 104 as an overlay to the GUI 406 associated with the computing-process flow 110. Put another way, the respective GUI 1102 may be rendered at the display screen 402 over the GUI 406 associated with the computing-process flow 110. For example, the given data 412 may include a resolution of the display screen 402, which may enable the intermediation server 108 and/or the computing module engine 114 and/or the computing module 414-1 to format the respective GUI 1102 accordingly. Furthermore, any location data of the client device 104, as provided in the given data 412, may enable the respective GUI 1102 to be provided in a language associated with the location of the client device 104.

It is understood that while the respective GUI 1102 is provided at the display screen 402, electronic buttons, fields, and the like, of the GUI 406 may be unavailable and/or greyed out.

As depicted, the respective GUI 1102 comprises a first electronic button 1104 for adding a provider object (e.g., the "SPECIAL SERVICE") to the flight, along with a respective cost thereof (e.g., "100 €"), to the given data 412, and a second electronic button 1106 for cancelling addition of the provider object. As depicted, the first electronic button 1104 is actuated via the pointer 702, which may cause input to be provided to the computing module 414-1 via the data pathway 1002 as described with respect to FIG. 12. However, when the second electronic button 1106 is actuated, the method 500 may end and the computing-process flow 110 may resume without modification of the given data 412.

The respective GUI 1102 may further comprise text and/or logos, and the like, associated with the provider system 102, for example, as depicted "FLY AEA" and "ONLY FROM AEA!!" (e.g., assuming that "AEA" identifies an airline and/or an entity associated with the provider system 102). Such text and/or logos, and/or other information and/or components of the respective GUI 1102 (e.g., a size, colors, fonts used, etc.) may be defined by the computing module 414-1. Indeed, the computing module 414-1 may enable the respective GUI 1102 to be branded according to an entity associated with the provider system 102.

Figure 12:
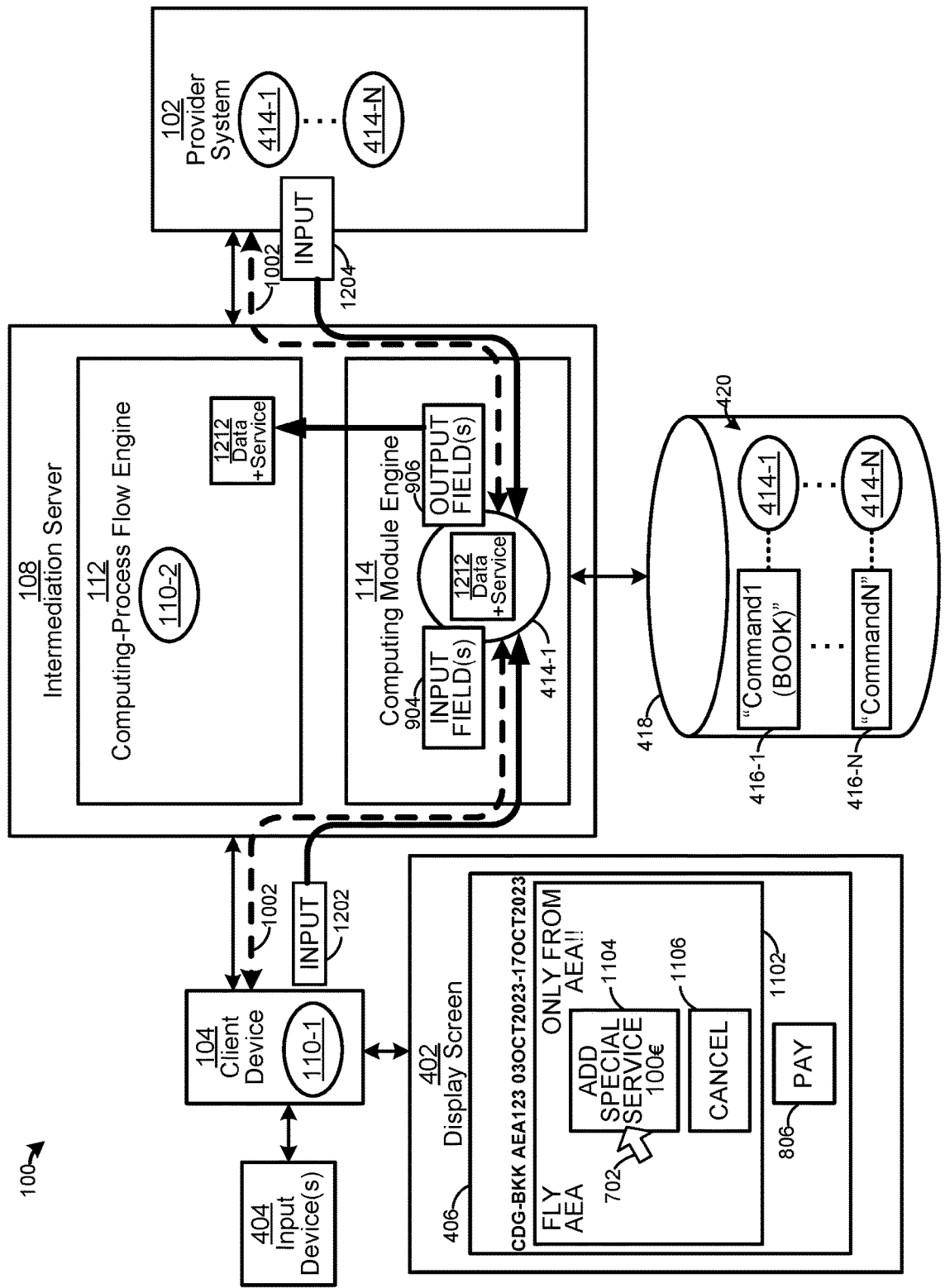
FIG. 12 depicts the system as depicted in FIG. 4 implementing further aspects of a method for providing a data pathway between a client device and a provider system, according to non-limiting examples.

Attention is next directed to FIG. 12, which depicts the client device 104 providing input 1202 to the computing module 414-1 via the data pathway 1002. Such input 1202 may cause an indication of the provider object indicated by the link 802 to be added to the given data 412, which modifies the given data 412 to modified given data 1212. For example, as depicted, the modified given data 1212 may comprise the same and/or similar data as the given data 412, and/or a subset thereof, but modified to include an indication of "Service" corresponding to an identifier of the provider object.

Alternatively, or in addition, and as depicted, the provider system 102 may provide input 1204 to the computing module 414-1 via the data pathway 1002, to cause the indication "Service" to be added to the given data 412, which modifies the given data 412 to the modified given data 1212.

In a particular example, the input 1202 may comprise a request to add a provider object to the given data 412. The input 1202 may be received at the computing module 414-1 and provided to the provider system 102 via the data pathway 1002. The provider system 102 may respond with the input 1204 which may cause the indication of the provider object to be added to the given data 412, which modifies the given data 412 to the modified given data 1212.

Hence, the input 1202, 1204 from one or more of the client device 104 and the provider system 102 may be processed by the computing module 414-1 in conjunction with modifying the given data 412.

As depicted, the modified given data 1212 may be provided to the computing-process flow engine 112, and the computing-process flow 110 may continue, as described below with respect to FIG. 15.

Figure 13:
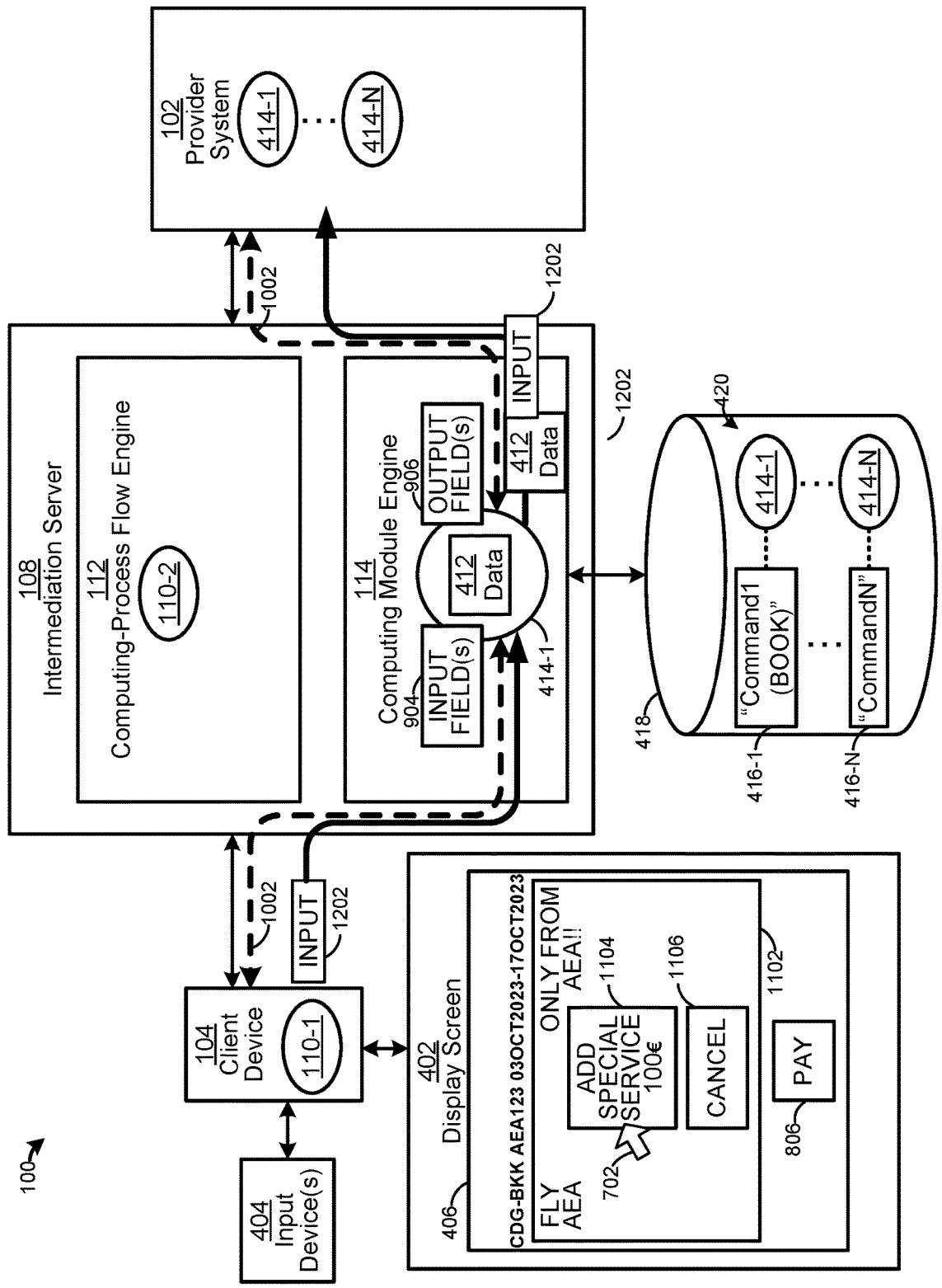
FIG. 13 depicts the system as depicted in FIG. 4 implementing further aspects of a method for providing a data pathway between a client device and a provider system, according to non-limiting examples.
Figure 14:
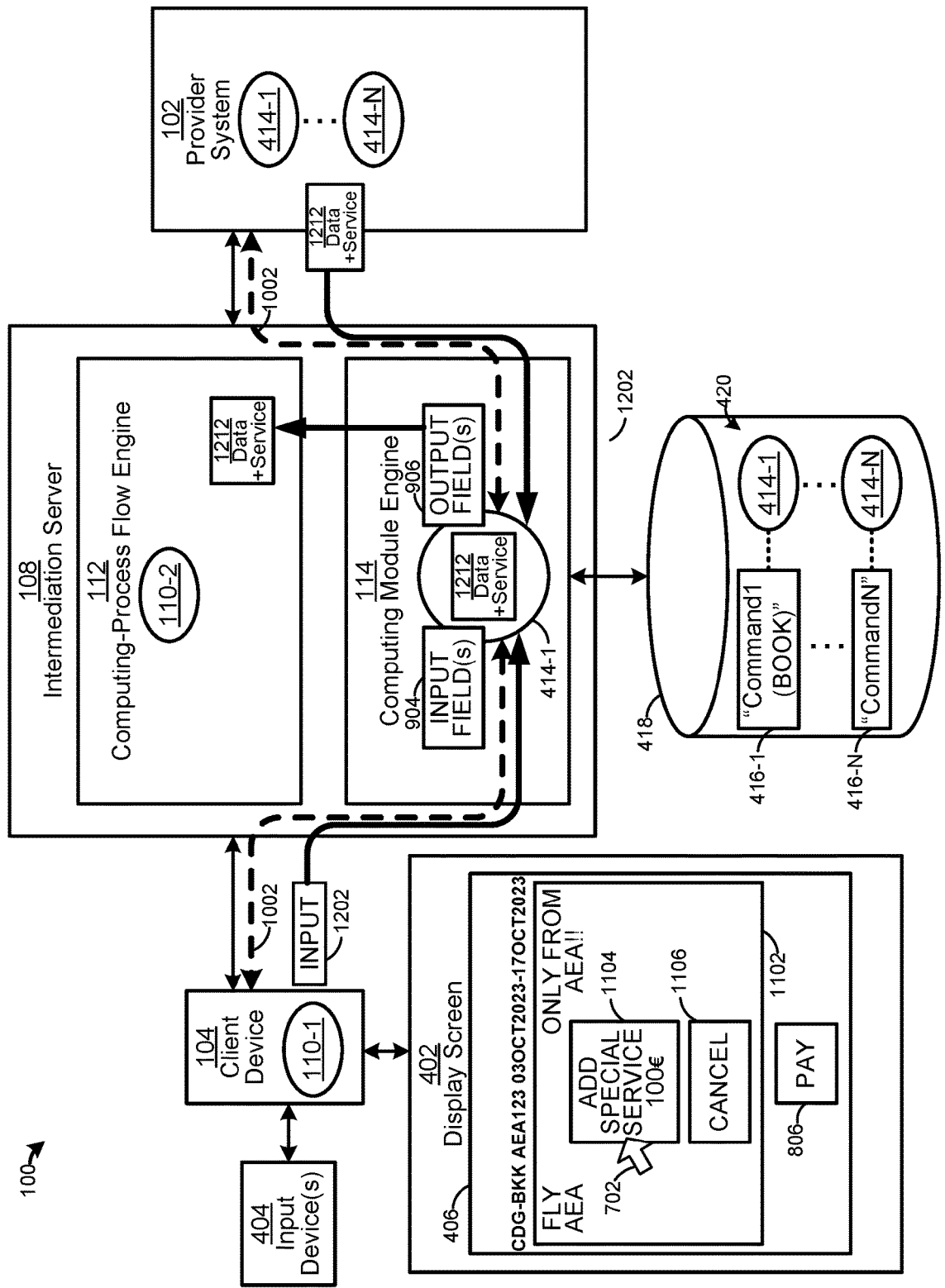
FIG. 14 depicts the system as depicted in FIG. 4 implementing further aspects of a method for providing a data pathway between a client device and a provider system, according to non-limiting examples.

However, attention is next directed to FIG. 13 and FIG. 14 which depicts an alternative example for modifying the given data 412. With attention next directed to FIG. 13, the input 1202 is again provided the computing module 414-1 via the data pathway 1002, however, in this example, the computing module 414-1 provides the input 1202 and the given data 412 to the provider system 102 via the data pathway 1002.

With attention next directed to FIG. 14, the provider system 102, in response to receiving the input 1202 and the given data 412, returns the modified given data 1212 via the data pathway 1002, which provided to the computing-process flow engine 112, and the computing-process flow 110 may continue.

Hence, according to FIG. 12, FIG. 13, and FIG. 14, executing the computing module 414-1 (e.g., at the block 506 of the method 500) may comprise one or more of: receiving, at the computing module 414-1, input 1202, 1204 from one or more of the client device 104 and the provider system 102 that is processed by the computing module 414-1 in conjunction with modifying the given data 412; and providing, from the computing module 414-1, to the provider system 102, the given data 412 which returns the modified given data 1212.

Regardless, it us understood that the modified given data 1212 may exclude the aforementioned data associated with the client device 104 and/or the provider system 102 that enables the data pathway 1002 to be established and/or the respective GUI 1102 to be generated, and may more specifically comprise provider object data of the given data 412, modified to include additional provider object data.

Figure 15:
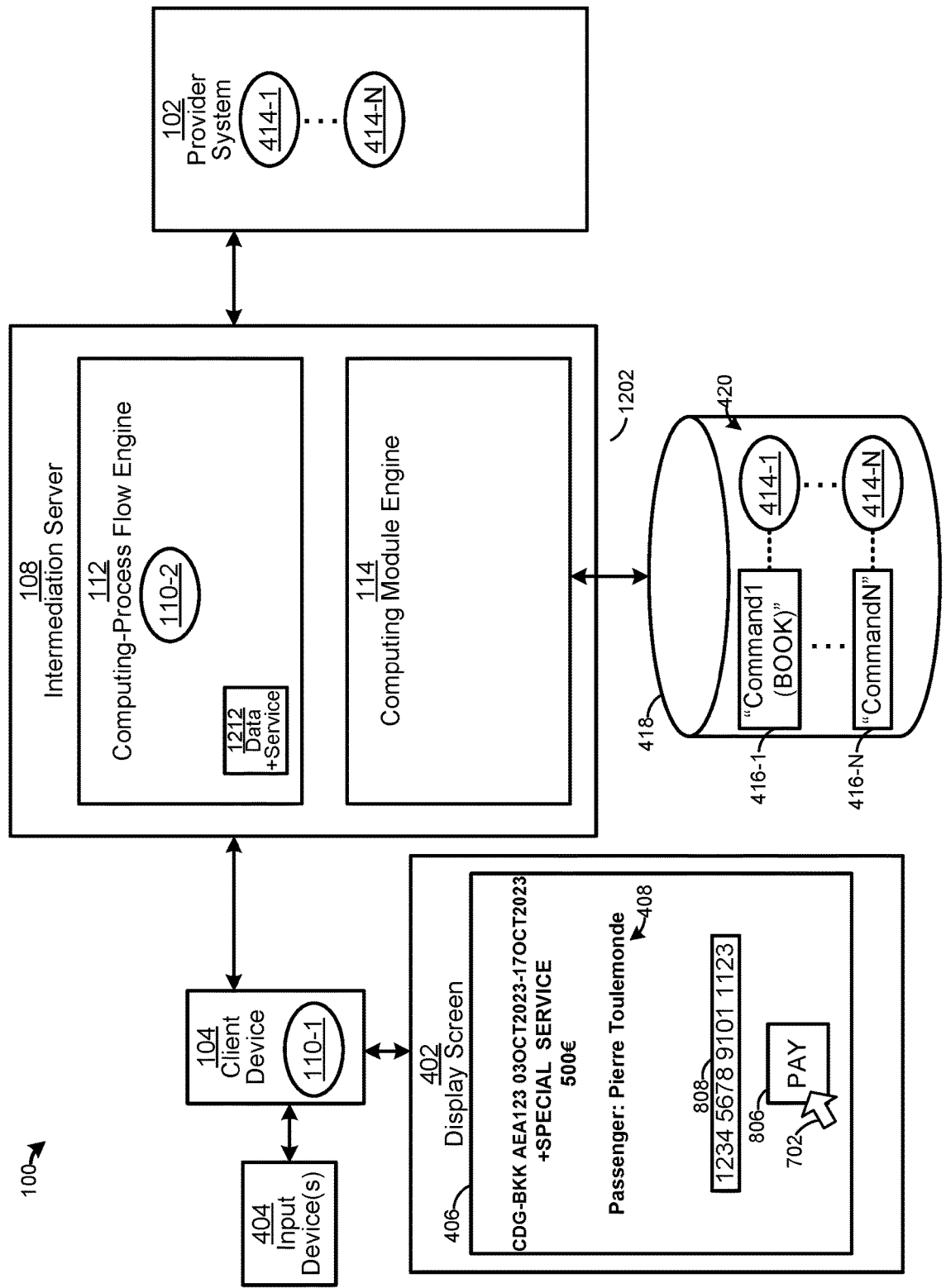
FIG. 15 depicts the system as depicted in FIG. 4 implementing further aspects of a method for providing a data pathway between a client device and a provider system, according to non-limiting examples.

Attention is next directed to FIG. 15 which depicts the computing-process flow 110 continuing (e.g., at the block 510 of the method 500). In particular, the respective GUI 1102 has been removed from the display screen 402. For example in response to the modified given data 1212 being received from the computing module 414-1, the intermediation server 108 may provide instructions to the client device 104 to remove the respective GUI 1102 from the display screen 402, such that input may be received at the GUI 406. Furthermore, the data pathway 1002 has been terminated, which may occur in response to the modified given data 1212 being received from the computing module 414-1.

As also depicted in FIG. 15, the information 408 of the GUI 406 has been updated to indicate that the provider object indicated by the modified given data 1212 has been added to the flight "+Special Service", and the price has been updated to 500€ (e.g., 400€+100€) to reflect the added cost of the provider object. Furthermore, payment information (e.g., a credit card number) has been added to the field 808 (e.g., via the input device 404). The step 302-4 may be completed by actuation of the electronic button 806 via the pointer 702, for example to purchase a combination of provider objects indicated by the information 408.

Furthermore, the method 500 may further comprise the controller 202 and/or the intermediation server 102: maintaining the association table 420 between the plurality of given commands 416 of the computing-process flow 110 and the plurality of computing modules 414 provided by the provider system 102, including the given command 416-1 associated with the computing module 414-1 (e.g., of the block 502 of the method 500); and providing a respective link to a respective computing module 414 in conjunction with implementing a respective given command 416 of the computing-process flow 110. Put another way, while the method 500 has been described with respect to one particular given command 416-1 and one particular respective computing module 414-1, the method 500 may be implemented using any suitable number of computing modules 414 associated with respective given commands 416.

In this manner, the given data 412 representing provider objects, and the like, may be modified to include provider objects not available via the computing-process flow 110.

As should by now be apparent, the operations and functions of the devices described herein are sufficiently complex as to require their implementation on a computer system, and cannot be performed, as a practical matter, in the human mind. In particular, computing devices, and the lie, such as set forth herein are understood as requiring and providing speed and accuracy and complexity management that are not obtainable by human mental steps, in addition to the inherently digital nature of such operations (e.g., a human mind cannot interface directly with, RAM or other digital storage, cannot transmit or receive electronic messages, cannot establish data pathways, among other features and functions set forth herein).

It is further understood that instance of the term "configured to", such as "a computing device configured to . . . ", "a processor configured to . . . ", "a controller configured to . . . ", and the like, may be understood to include a feature of a computer-readable storage medium having stored thereon program instructions that, when executed by a computing device and/or a processor and/or a controller, and the like, may cause the computing device and/or the processor and/or the controller to perform a set of operations which may comprise the features that the computing device and/or the processor and/or the controller, and the like, are configured to implement. Hence, the term "configured to" is understood not to be unduly limiting to means plus function interpretations, and the like.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein may be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein may be achieved using a computing apparatus that has access to a code memory (not shown), which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program may be stored as a computer program product comprising a computer usable medium. Further, a persistent storage device may comprise the computer readable program code. It is yet further appreciated that the computer-readable program code and/or computer usable medium may comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium may be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:
executing, via an intermediation server, at least a portion of a computing-process flow in which communication between a client device and the intermediation server occurs;
receiving, via the intermediation server, from a provider system, a computing module associated with a given command of the computing-process flow implemented in conjunction with communicating with the client device, the computing module compatible with data of the computing-process flow;
providing, via the intermediation server, to the client device, a link to the computing module in conjunction with implementing the given command of the computing-process flow;
in response to receiving an indication that the link to the computing module is selected, pausing the computing-process flow and executing, via the intermediation server, the computing module, including providing given data of the computing-process flow to the computing module, the computing module providing a data pathway between the client device and the provider system to modify the given data, such that communication between the client device and the provider system occurs via the data pathway, the computing module implemented in isolation from other components of the intermediation server implementing the computing-process flow such that the computing module is implemented at the intermediation server independent of the computing-process flow;

receiving, via the intermediation server, from the computing module, modified given data compatible with the computing-process flow; and continuing, via the intermediation server, to implement the computing-process flow using the modified given data, the computing-process flow remaining paused until the modified given data is received from the computing module.

2. The method of claim 1, further comprising:
maintaining an association table between a plurality of given commands of the computing-process flow and a plurality of computing modules provided by the provider system, including the given command associated with the computing module; and
providing, via the intermediation server, a respective link to a respective computing module in conjunction with implementing a respective given command of the computing-process flow.

3. The method of claim 1, further comprising:
in conjunction with implementing the computing-process flow, embedding, in a graphic user interface (GUI), the link to the computing module in conjunction with implementing the given command; and
providing the GUI with the link, as embedded, to the client device,
wherein receiving the indication that the link to the computing module is selected comprises receiving a selection of the link embedded in the GUI from the client device.

4. The method of claim 1, wherein executing the computing module comprises one or more of:
receiving, at the computing module, input from one or more of the client device and the provider system that is processed by the computing module in conjunction with modifying the given data; and
providing, from the computing module, to the provider system, the given data which returns the modified given data.

5. The method of claim 1, further comprising:
in conjunction with executing the computing module, providing, to the client device, a respective graphic user interface (GUI) for receiving input to modify the given data used by the computing-process flow, the respective GUI further for providing the input to modify the given data via the data pathway between the client device and the provider system.

6. The method of claim 5, wherein the respective GUI is provided to the client device as an overlay to a GUI associated with the computing-process flow.

7. The method of claim 1, further comprising:
implementing, via the intermediation server, a computing module engine to execute the computing module, the computing module engine isolated from the other components of the intermediation server implementing the computing-process flow.

8. The method of claim 1, wherein the computing module comprise one or more predefined input fields and one or more predefined output fields, the given data of the computing-process flow the computing module provided via the one or more predefined input fields, and the modified given data received via the one or more predefined output fields.

9. The method of claim 1, wherein one or more of the intermediation server and the provider system operate according to a Global Distribution System (GDS)-based data exchange.

10. An intermediation server for interaction with a virtual platform, the intermediation server comprising:
a controller; and
a computer-readable storage medium having stored thereon program instructions that, when executed by the controller, causes the controller to perform a set of operations comprising:
executing at least a portion of a computing-process flow in which communication between a client device and the intermediation server occurs;
receiving, from a provider system, a computing module associated with a given command of the computing-process flow implemented in conjunction with communicating with the client device, the computing module compatible with data of the computing-process flow;
providing, to the client device, a link to the computing module in conjunction with implementing the given command of the computing-process flow;
in response to receiving an indication that the link to the computing module is selected, pausing the computing-process flow and executing the computing module, including providing given data of the computing-process flow to the computing module, the computing module providing a data pathway between the client device and the provider system to modify the given data, such that communication between the client device and the provider system occurs via the data pathway, the computing module implemented in isolation from other components of the intermediation server implementing the computing-process flow such that the computing module is implemented at the intermediation server independent of the computing-process flow;
receiving, from the computing module, modified given data compatible with the computing-process flow; and
continuing to implement the computing-process flow using the modified given data, the computing-process flow remaining paused until the modified given data is received from the computing module.

11. The intermediation server of claim 10, wherein the set of operations further comprises:
maintaining an association table between a plurality of given commands of the computing-process flow and a plurality of computing modules provided by the provider system, including the given command associated with the computing module; and
providing a respective link to a respective computing module in conjunction with implementing a respective given command of the computing-process flow.

12. The intermediation server of claim 10, wherein the set of operations further comprises:
in conjunction with implementing the computing-process flow, embedding, in a graphic user interface (GUI), the link to the computing module in conjunction with implementing the given command; and
providing the GUI with the link, as embedded, to the client device, wherein receiving the indication that the link to the computing module is selected comprises receiving a selection of the link embedded in the GUI from the client device.

13. The intermediation server of claim 10, wherein executing the computing module comprises one or more of:
   receiving, at the computing module, input from one or more of the client device and the provider system that is processed by the computing module in conjunction with modifying the given data; and
   providing, from the computing module, to the provider system, the given data which returns the modified given data.

14. The intermediation server of claim 10, wherein the set of operations further comprises:
   in conjunction with executing the computing module, providing, to the client device, a respective graphic user interface (GUI) for receiving input to modify the given data used by the computing-process flow, the respective GUI further for providing the input to modify the given data via the data pathway between the client device and the provider system.

15. The intermediation server of claim 14, wherein the respective GUI is provided to the client device as an overlay to a GUI associated with the computing-process flow.

16. The intermediation server of claim 10, wherein the set of operations further comprises:
   implementing a computing module engine to execute the computing module, the computing module engine isolated from the other components of the intermediation server implementing the computing-process flow.

17. The intermediation server of claim 10, wherein the computing module comprise one or more predefined input fields and one or more predefined output fields, the given data of the computing-process flow the computing module provided via the one or more predefined input fields, and the modified given data received via the one or more predefined output fields.

18. The intermediation server of claim 10, wherein one or more of the intermediation server and the provider system operate according to a Global Distribution System (GDS)-based data exchange.

* * * * *